US012645458B2

(12) United States Patent
Adelman et al.

(10) Patent No.: US 12,645,458 B2
(45) Date of Patent: Jun. 2, 2026

(54) DEVICE, METHOD AND SYSTEM FOR EXECUTING A TILE LOAD AND EXPAND INSTRUCTION

(71) Applicant: Intel Corporation, Santa Clara, CA (US)

(72) Inventors: Menachem Adelman, Modi'in (IL); Amit Gradstein, Binyamina (IL); Simon Rubanovich, Haifa (IL); Barukh Ziv, Haifa (IL); Uri Sherman, Bustan Hagalil (IL); Dana Rip, Haifa (IL); Shahar Mizrahi, Haifa (IL); Dan Baum, Haifa (IL); Rinat Rappoport, Haifa (IL); Nilesh Jain, Portland, OR (US); Zeev Sperber, Zichron Yackov (IL); Gideon Stupp, Oranit (IL); Alexander Heinecke, San Jose, CA (US); Christopher Hughes, Santa Clara, CA (US); Evangelos Georganas, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/841,558

(22) Filed: Jun. 15, 2022

(65) Prior Publication Data

US 2023/0409326 A1      Dec. 21, 2023

(51) Int. Cl.
*G06F 9/30* (2018.01)
*G06F 9/38* (2018.01)
*G06N 3/04* (2023.01)

(52) U.S. Cl.
CPC ...... *G06F 9/30145* (2013.01); *G06F 9/30047* (2013.01); *G06F 9/30178* (2013.01); *G06F 9/3887* (2013.01); *G06N 3/04* (2013.01)

(58) Field of Classification Search
CPC ................................................ G06F 9/30145
See application file for complete search history.

(56) References Cited

U.S. PATENT DOCUMENTS

| | | | | |
|---|---|---|---|---|
| 11,392,829 B1 * | 7/2022 | Pool | .......................... | G06F 17/16 |
| 11,803,736 B1 * | 10/2023 | Meyer | .................... | G06F 9/3013 |

(Continued)

OTHER PUBLICATIONS

Extended European Search Report from European Patent Application No. 23171339.7 notified Nov. 8, 2023, 12 pgs.

(Continued)

*Primary Examiner* — Michael J Metzger
(74) *Attorney, Agent, or Firm* — Essential Patents Group, LLP

(57) ABSTRACT

Techniques and mechanisms for processor circuitry to execute a load and expand instruction of an instruction set to generate decompressed matrix data. In an embodiment, the instruction comprises a source operand which indicates a location from which compressed matrix data, and corresponding metadata, are to be accessed. A destination operand of the instruction indicates a location which is to receive decompressed metadata, which is generated, during execution of the instruction, based on the compressed matrix data and the corresponding metadata. The metadata comprises compression mask information which identifies which elements of the matrix have been masked from the compressed matrix data. In another embodiment, the instruction further comprises a count operand which identifies a total number of the unmasked matrix elements which are represented in the compressed matrix data.

14 Claims, 20 Drawing Sheets

(56) References Cited

U.S. PATENT DOCUMENTS

| | | | |
|---|---|---|---|
| 2012/0254592 A1 | 10/2012 | San Adrian et al. | |
| 2018/0285733 A1* | 10/2018 | Mellempudi | G06N 3/08 |
| 2019/0042257 A1* | 2/2019 | Baum | G06F 9/3802 |
| 2020/0065352 A1 | 2/2020 | Valentine et al. | |
| 2020/0233666 A1 | 7/2020 | Valentine et al. | |
| 2020/0342632 A1* | 10/2020 | Frumkin | G06F 7/544 |
| 2021/0035258 A1* | 2/2021 | Ray | G06F 9/30036 |
| 2021/0240684 A1* | 8/2021 | Xiao | G06N 3/082 |
| 2022/0012592 A1* | 1/2022 | Jain | G06N 3/08 |
| 2022/0012598 A1* | 1/2022 | Fok | G06F 9/3836 |
| 2022/0366008 A1* | 11/2022 | Shin | G06F 9/541 |
| 2023/0010897 A1* | 1/2023 | Young | G06F 17/16 |

OTHER PUBLICATIONS

Adavally, Shashank, et al., "ExPress: Simultaneously Achieving Storage, Execution and Energy Efficiencies in Moderately Sparse Matrix Computations", 2020 2nd Symposium on Signal Processing Systems, ACMPUB27, New York, NY, USA, Sep. 28, 2020, pp. 46-60.

* cited by examiner

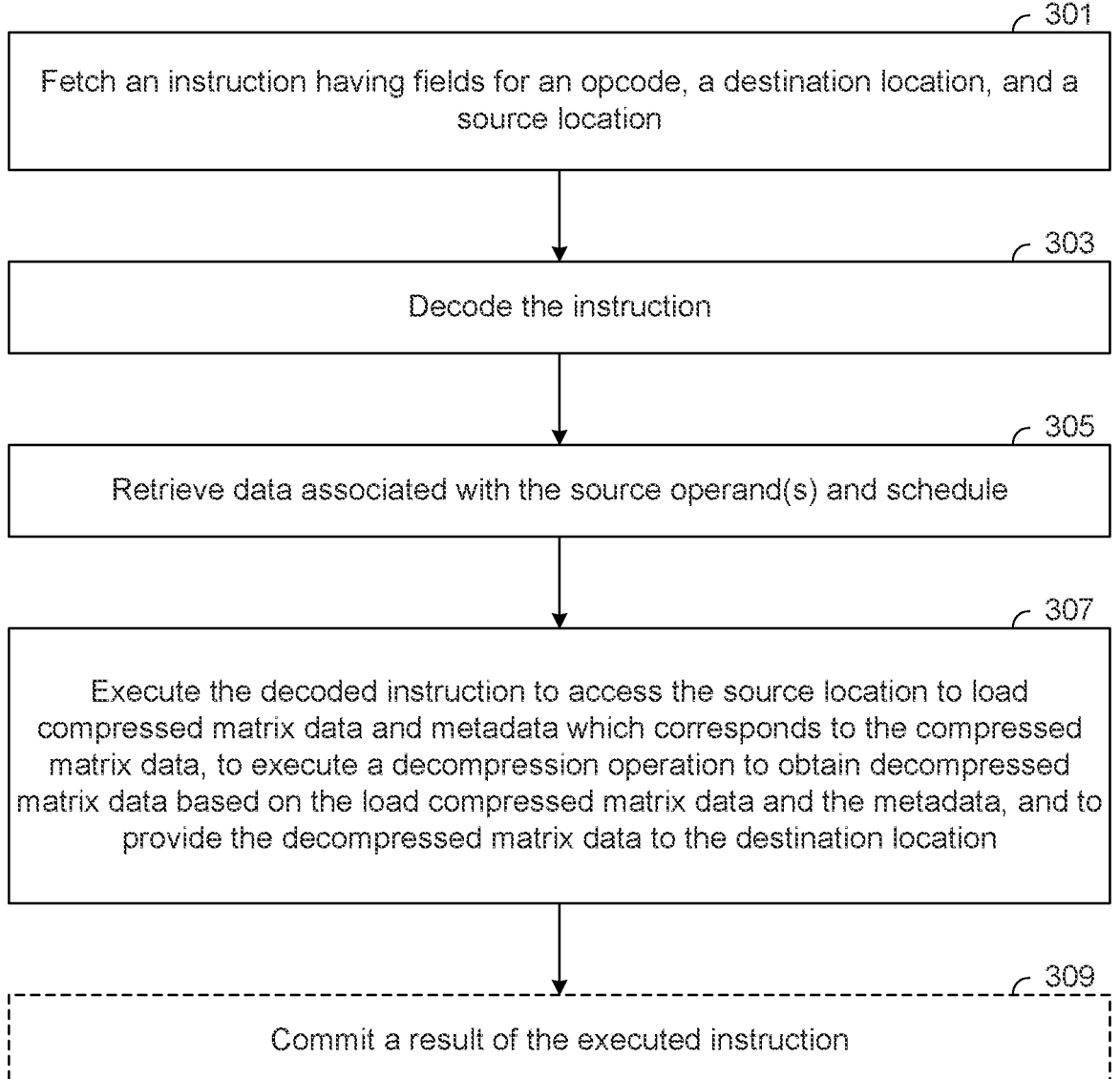

Fetch an instruction having fields for an opcode, a destination location, and a source location                    301

Decode the instruction                    303

Retrieve data associated with the source operand(s) and schedule                    305

Execute the decoded instruction to access the source location to load compressed matrix data and metadata which corresponds to the compressed matrix data, to execute a decompression operation to obtain decompressed matrix data based on the load compressed matrix data and the metadata, and to provide the decompressed matrix data to the destination location                    307

Commit a result of the executed instruction                    309

FIG. 3

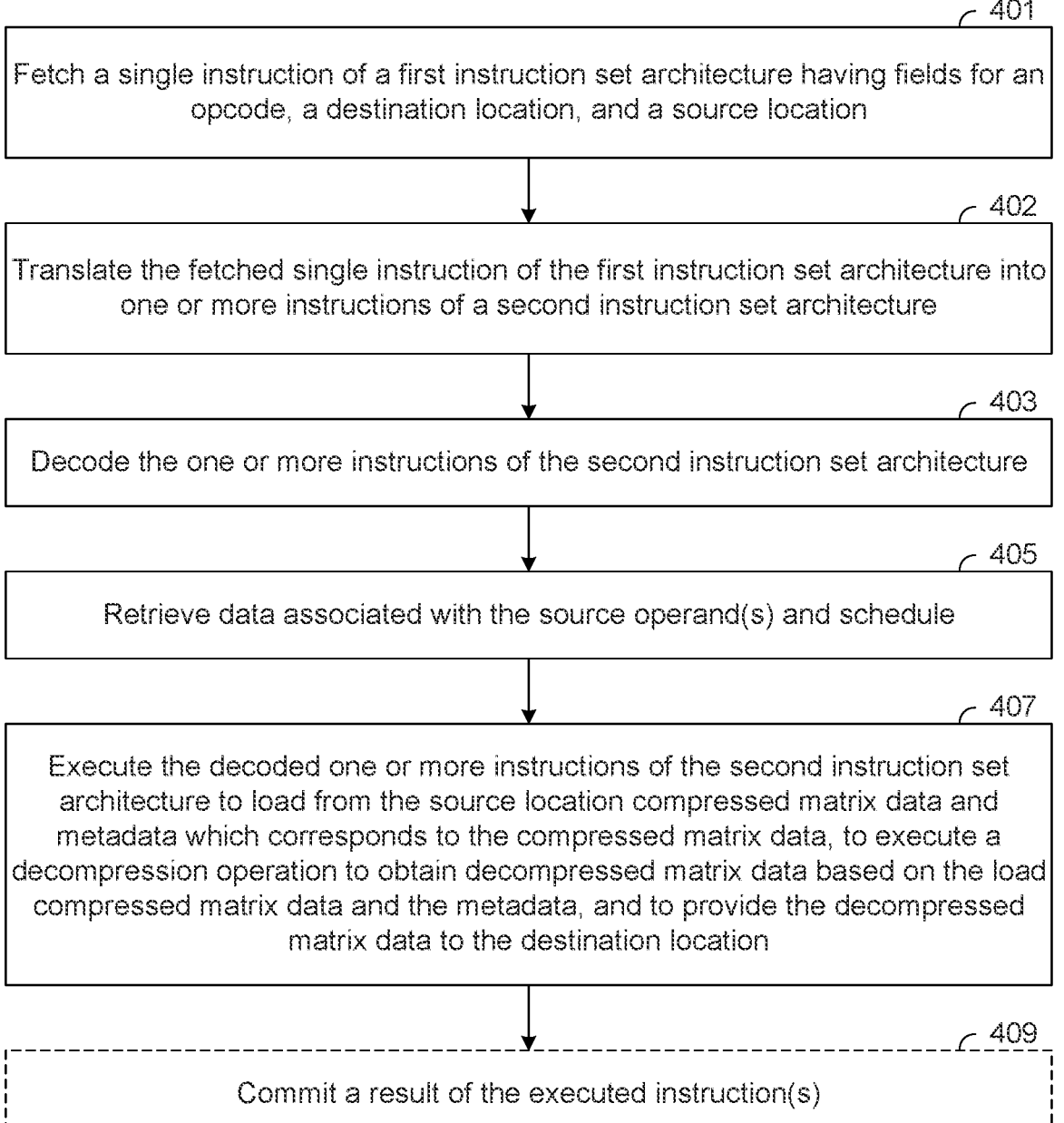

401

Fetch a single instruction of a first instruction set architecture having fields for an opcode, a destination location, and a source location

402

Translate the fetched single instruction of the first instruction set architecture into one or more instructions of a second instruction set architecture

403

Decode the one or more instructions of the second instruction set architecture

405

Retrieve data associated with the source operand(s) and schedule

407

Execute the decoded one or more instructions of the second instruction set architecture to load from the source location compressed matrix data and metadata which corresponds to the compressed matrix data, to execute a decompression operation to obtain decompressed matrix data based on the load compressed matrix data and the metadata, and to provide the decompressed matrix data to the destination location

409

Commit a result of the executed instruction(s)

FIG. 4

Bus
701

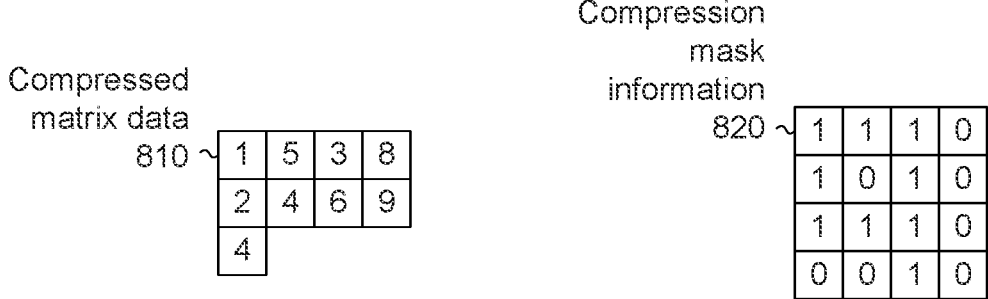
Compressed
matrix data
810
Compression
mask
information
820
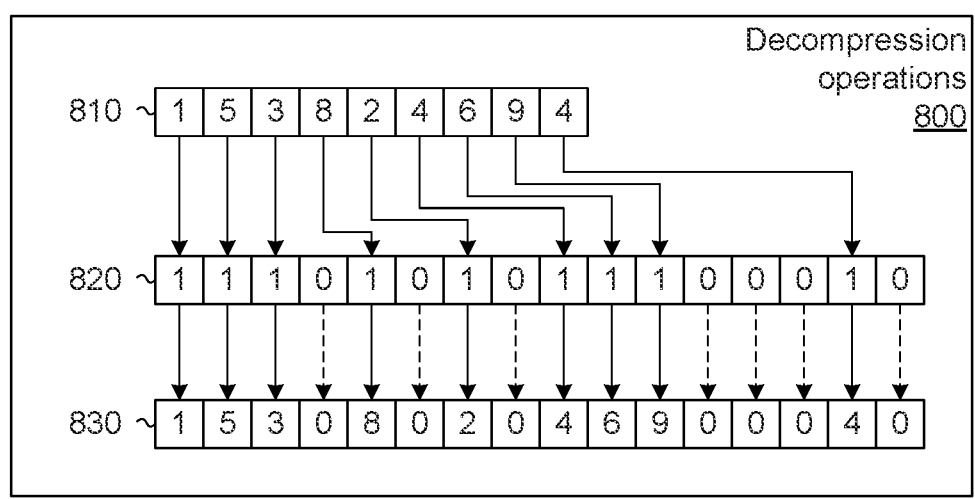
Decompression
operations
800
810
820
830
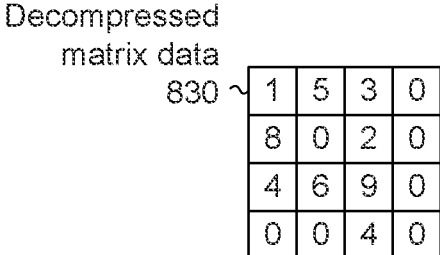
Decompressed
matrix data
830
FIG. 8

1000

TLDEXPANDB[,T1] tdest, tsib, count

1010

```
elements := tdest.colsb/4          // Number of byte elements in tile row
sc_mem := tsib.base + tsib.displacement
                                   // Memory address of sparsity controls bitmask
data_mem := tsib.index             // Memory address of decompressed data sc_size_bits := palette[palette_id].max_colsb
                                   // Sparsity controls size in bits for one row
                                   // (bit per byte)
sc_size := sc_size_bits * 8        // Sparsity controls size in bytes
data_size := count                 // Compressed data size in bytes
```

1012

```
sc := read_memory(sc_mem, sc_size * tdest.rows)
data := 0
data := read_memory(data_mem, data_size)
                                   // Elements beyond data_size are zeros data_ptr := 0
```

1014

```
for m in 0...tdest.rows:
        tmp := 0
        for n in 0...elements:
                if sc.bit[m * sc_size_bits + n] == 1:
                        tmp.byte[n] := data.byte[data_ptr]
                        data_ptr += 1
        write_row_and_zero(tdest, m, tmp, tdest.colsb)

zero_upper_rows(tdest, tdest.rows)
zero_tileconfig_start()
```

```
TLDEXPANDW[,T1] tdest, tsib, count
```

1110

```
elements := tdest.colsb/2          // Number of word elements in tile row
sc_mem := tsib.base + tsib.displacement
                                   // Memory address of sparsity controls bitmask
data_mem := tsib.index             // Memory address of decompressed data sc_size_bits := palette[palette_id].max_colsb/2
                                   // Sparsity controls size in bits for one row
                                   // (bit per word)
sc_size := sc_size_bits * 8        // Sparsity controls size in bytes
data_size := count * 2             // Compressed data size in bytes
```

1112

```
sc := read_memory(sc_mem, sc_size * tdest.rows)
data := 0
data := read_memory(data_mem, data_size)
                                   // Elements beyond data_size are zeros data_ptr := 0
```

1114

```
for m in 0...tdest.rows:
        tmp := 0
        for n in 0...elements:
                if sc.bit[m * sc_size_bits + n] == 1:
                        tmp.word[n] := data.word[data_ptr]
                        data_ptr += 1
        write_row_and_zero(tdest, m, tmp, tdest.colsb)

zero_upper_rows(tdest, tdest.rows)
zero_tileconfig_start()
```

PROCESSOR 1300
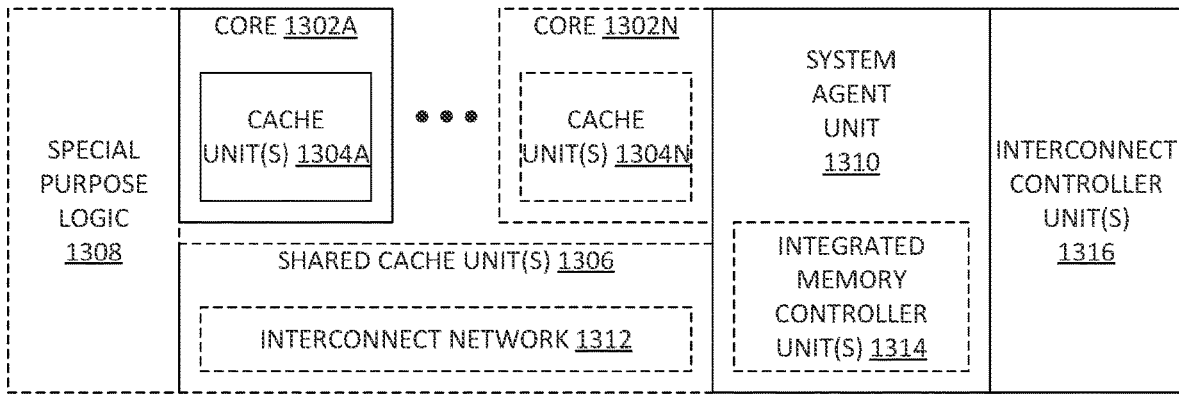
FIG. 13

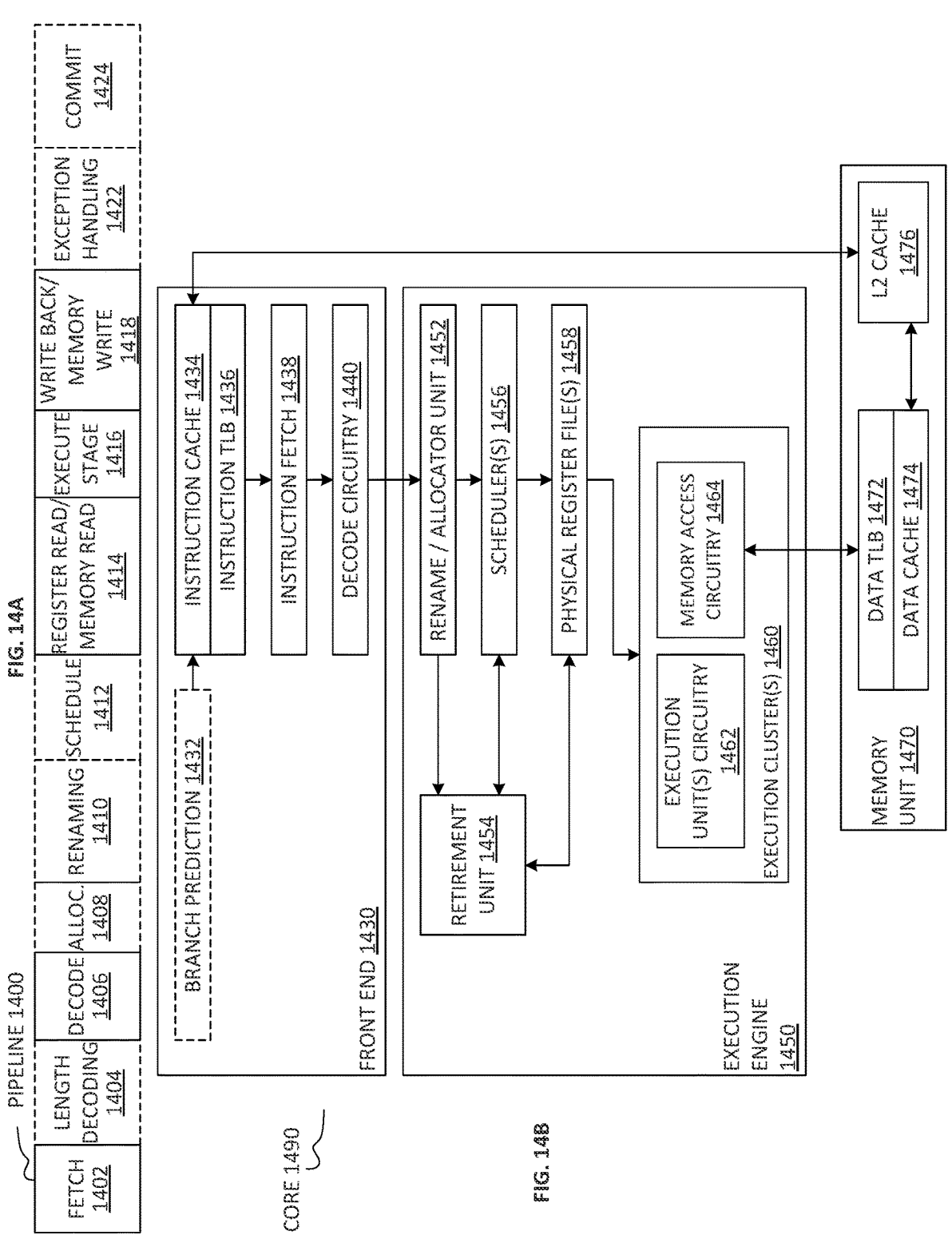

FIG. 14A

PIPELINE 1400

| FETCH 1402 | LENGTH DECODING 1404 | DECODE 1406 | ALLOC. 1408 | RENAMING 1410 | SCHEDULE 1412 | REGISTER READ/ MEMORY READ 1414 | EXECUTE STAGE 1416 | WRITE BACK/ MEMORY WRITE 1418 | EXCEPTION HANDLING 1422 | COMMIT 1424 |

FIG. 14B

CORE 1490

FRONT END 1430

BRANCH PREDICTION 1432

INSTRUCTION CACHE 1434

INSTRUCTION TLB 1436

INSTRUCTION FETCH 1438

DECODE CIRCUITRY 1440

EXECUTION ENGINE 1450

RENAME / ALLOCATOR UNIT 1452

RETIREMENT UNIT 1454

SCHEDULER(S) 1456

PHYSICAL REGISTER FILE(S) 1458

EXECUTION CLUSTER(S) 1460

EXECUTION UNIT(S) CIRCUITRY 1462

MEMORY ACCESS CIRCUITRY 1464

MEMORY UNIT 1470

DATA TLB 1472

DATA CACHE 1474

L2 CACHE 1476

| Prefix(es) 1701 | Opcode 1703 | Addressing 1705 | Displacement 1707 | Immediate 1709 |
|---|---|---|---|---|

FIG. 19

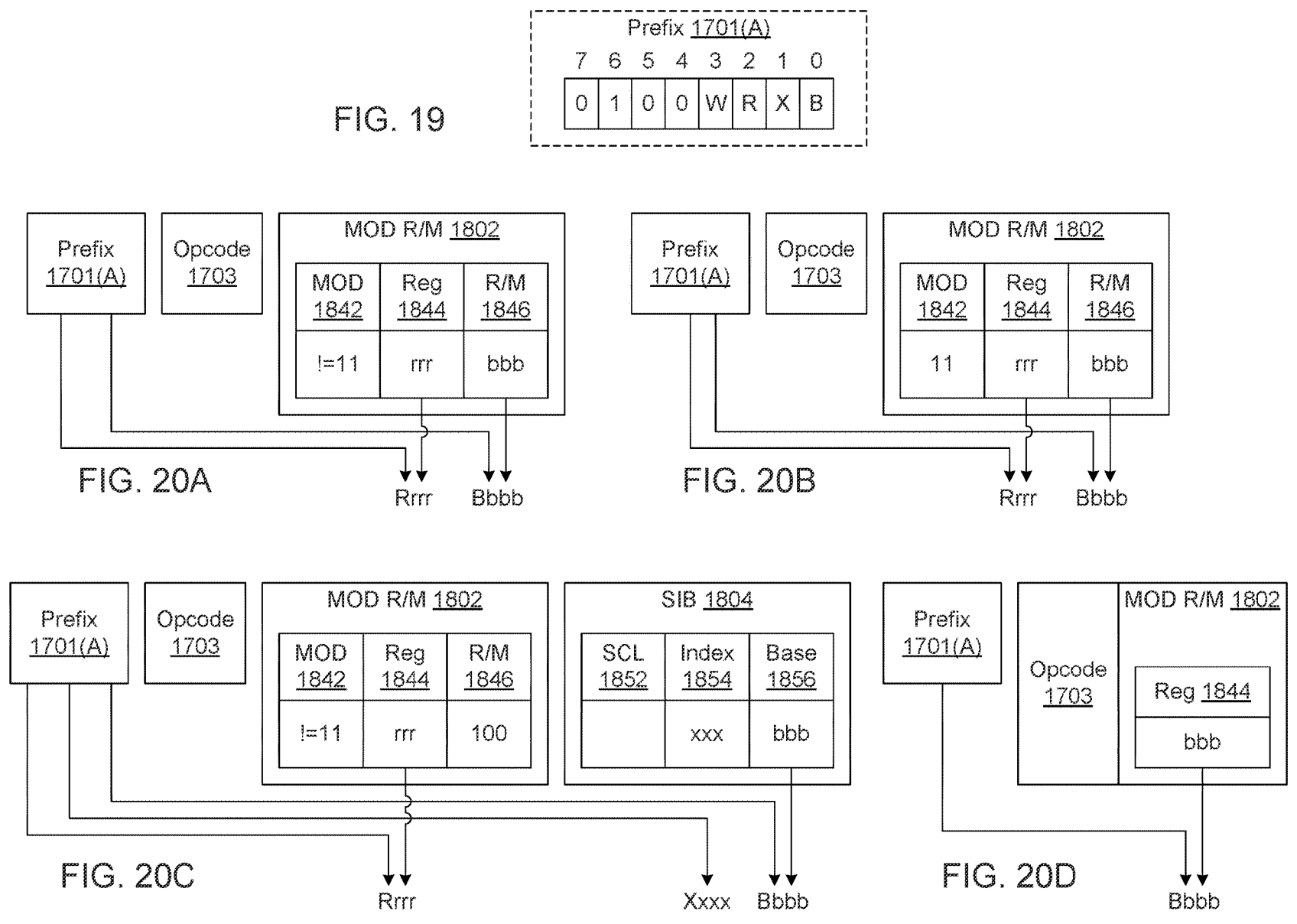

Prefix 1701(A)

| 7 | 6 | 5 | 4 | 3 | 2 | 1 | 0 |
|---|---|---|---|---|---|---|---|
| 0 | 1 | 0 | 0 | W | R | X | B |

FIG. 20A

Prefix 1701(A)

Opcode 1703

MOD R/M 1802

| MOD 1842 | Reg 1844 | R/M 1846 |
|---|---|---|
| !=11 | rrr | bbb |

→ Rrrr
→ Bbbb

FIG. 20B

Prefix 1701(A)

Opcode 1703

MOD R/M 1802

| MOD 1842 | Reg 1844 | R/M 1846 |
|---|---|---|
| 11 | rrr | bbb |

→ Rrrr
→ Bbbb

FIG. 20C

Prefix 1701(A)

Opcode 1703

MOD R/M 1802

| MOD 1842 | Reg 1844 | R/M 1846 |
|---|---|---|
| !=11 | rrr | 100 |

→ Rrrr

SIB 1804

| SCL 1852 | Index 1854 | Base 1856 |
|---|---|---|
| | xxx | bbb |

→ Xxxx
→ Bbbb

FIG. 20D

Prefix 1701(A)

Opcode 1703

MOD R/M 1802

| | Reg 1844 | |
|---|---|---|
| | bbb | |

→ Bbbb

PROCESSOR WITHOUT A FIRST ISA INSTRUCTION SET CORE 2314

PROCESSOR WITH AT LEAST ONE FIRST ISA INSTRUCTION SET CORE 2316

HARDWARE

SOFTWARE

ALTERNATIVE ISA BINARY CODE 2310

INSTRUCTION CONVERTER 2312

FIRST ISA BINARY CODE 2306

ALTERNATIVE INSTRUCTION SET COMPILER 2308

FIRST ISA COMPILER 2304

HIGH LEVEL LANGUAGE 2302

DEVICE, METHOD AND SYSTEM FOR EXECUTING A TILE LOAD AND EXPAND INSTRUCTION

BACKGROUND

1. Technical Field

The field relates generally to computer processor architecture, and, more specifically, to an instruction which when executed processes compressed matrix data.

2. Background Art

Matrices are increasingly important in many computing tasks such as machine learning and other bulk data processing.

BRIEF DESCRIPTION OF THE DRAWINGS

The various embodiments of the present invention are illustrated by way of example, and not by way of limitation, in the figures of the accompanying drawings and in which:

FIGS. 3 and 4 are flow diagrams each illustrating features of a respective method for processing a tile load and decompress instruction according to a corresponding embodiment.

FIG. 8 shows features of information which is processed with an execution of a matrix decompression instruction according to an embodiment.

FIGS. 10 and 11 show examples of pseudocode representing methods for executing a matrix decompression instruction according to a corresponding embodiment.

FIG. 13 illustrates a block diagram of an example processor that may have more than one core and an integrated memory controller.

FIG. 14A is a block diagram illustrating both an exemplary in-order pipeline and an exemplary register renaming, out-of-order issue/execution pipeline according to examples.

FIG. 14B is a block diagram illustrating both an exemplary example of an in-order architecture core and an exemplary register renaming, out-of-order issue/execution architecture core to be included in a processor according to examples.

FIG. 19 illustrates examples of a first prefix.

FIGS. 20A-D illustrate examples of how the R, X, and B fields of the first prefix in FIG. 19 are used.

DETAILED DESCRIPTION

The present disclosure relates to methods, apparatus, systems, and non-transitory computer-readable storage media for processing an instruction for decompressing matrix data. Small batch size artificial intelligence is one example of a technology which utilizes significant memory bandwidth, such as when an artificial intelligence system fetches neural network weights (e.g., a weight matrix) from a dynamic random-access memory (DRAM) to perform an inference. As such, the weight matrix (e.g., a tile) is one type of matrix which can contribute to bottlenecking that, for example, limits a rate at which the neural network performs an inference.

To address the performance bottlenecking, the memory bandwidth may be increased. However, increasing memory bandwidth comes at an increased Total Cost of Ownership (TCO) and opportunity cost for a user (e.g., costs associated with implementing High Bandwidth Memory (HBM), adding more memory channels or dual in-line memory modules (DIMMs), etc.). Additionally, bandwidth problems may still manifest with the increased memory bandwidth when moving the neural network weights between the layers as a result of large weight matrices and/or weight matrices having large sparsity.

Embodiments disclosed herein variously provide functionality of a processor which supports the execution of an instruction—e.g., one of an instruction set architecture (ISA)—to load data representing a compressed version of a matrix, and to perform one or more decompression operations to obtain other data which represents a decompressed version of that matrix. Some example embodiments disclosed herein variously provide functionality that leverages advanced vector extension (AVX) and advanced matrix extension (AMX) technology to enable decompression of a matrix which, for example, comprises quantized neural network weights. For example, an example program (e.g., a machine learning program) that utilizes AVX can decompress neural network weights. As such, examples disclosed herein improve compute efficiency (e.g., tile matrix multiplying via AMX, execution units on GPUs) in addition to utilizing bandwidth efficiently.

Figure 1:
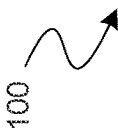
FIG. 1 illustrates features of a system to execute a tile load and decompress instruction according to an embodiment.

FIG. 1 illustrates features of a system 100 to perform an execution of an instruction (referred to herein as a "load and expand instruction"), where said execution includes a loading, and at least a partial decompression, of data which represents a compressed version of a matrix.

In some embodiments, system 100 includes any of various types of processors such as, for example, micro-processor, an embedded processor, a digital signal processor (DSP), a central processing unit (CPU), a graphical processing unit (GPU), a visual processing unit (VPU), a network processor, FPGA, a device to execute code to implement the technologies described herein, and so on, or combinations thereof. In various embodiments, system 100 includes one or more cores—e.g., wherein one such core comprises the execution circuitry 110 shown. In one such embodiment, system 100 includes one or more single-threaded cores, multithreaded cores including more than one hardware thread context (or "logical processor") per core, and so on, or combinations thereof. In an embodiment, execution circuitry 110 includes—or alternatively, is coupled to—an instruction decoder to recognize and/or decode an instruction (e.g., from an instruction register), to activate appropriate circuitry to execute the instruction, to verify that a stream of instructions (e.g., operation codes, etc.) will compute, and so on, or combinations thereof.

In the example embodiments shown, execution circuitry 110 receives a decoded version of a load and expand instruction which includes or is otherwise identified with the illustrative opcode TLDEXPAND shown. One example embodiment of a format for a TLDEXPAND instruction is TLDEXPAND TDEST, TSIB, COUNT. In some embodiments, TLDEXPAND is the opcode mnemonic of the instruction. In one such embodiment, TDEST is a field for a first operand which is to specify or otherwise indicate a location (referred to herein as a "destination location") which is to receive a decompressed matrix that is generated by an execution of the TLDEXPAND instruction. In the example embodiment shown, the first operand in the TDEST field indicates a destination 132 in a repository 130 which is included in (or alternatively, is coupled to) system 100. By way of illustration and not limitation, the first operand comprises an identifier of a packed data register, a general purpose register (GPR), a floating-point register, or any of various other processor registers which are to receive decompressed matrix data 103. Alternatively, the first operand comprises an identifier of an address corresponding to a location in a cache memory of the processor, or (for example) in a memory that is coupled to the processor.

In an embodiment, TSIB is a field of the TLDEXPAND instruction which is to provide a second operand which specifies or otherwise indicates a location (referred to herein as a "source location") from which compressed matrix data—and, for example, metadata corresponding to said compressed matrix data—is to be retrieved. In the example embodiment shown, the second operand in the TSIB field indicates a location in a repository 120 which is included in (or alternatively, is coupled to) system 100. By way of illustration and not limitation, the second operand comprises an identifier of a location from which execution circuitry 110 is to retrieve compressed matrix data 101 and/or metadata 102 which corresponds to the compressed matrix data 101. For example, the second operand comprises an identifier of a processor register, or an identifier of an address corresponding to a location in a cache (or other) memory which is accessible to the processor comprising execution circuitry 110. In some embodiments, the first operand and the second operand indicate different respective locations in the same repository.

In various embodiments, encodings of the TLDEXPAND instruction include a scale-index-base (SIB) type memory addressing operand that indirectly identifies multiple indexed locations (e.g., including memory locations). For example, the second operand in the TSIB field is one such SIB operand, in some embodiments. In one embodiment, an SIB type operand includes an encoding identifying a base address register. For example, the contents of the base address register represent a base address in memory from which the addresses of the particular locations in memory are calculated. In one embodiment, the base address is the address of the first location in a block of potential source locations for an extended vector instruction. In one embodiment, a SIB type memory operand includes an encoding identifying an index register. Each element of the index register specifies an index or offset value usable to compute, from the base address, an address of a respective source location within a block of potential source locations. In one embodiment, an SIB type memory operand includes an encoding specifying a scaling factor to be applied to each index value when computing a respective source address. For example, if a scaling factor value of four is encoded in the SIB type memory operand, each index value obtained from an element of the index register is to be multiplied by four and then added to the base address to compute a source address.

In one embodiment, an SIB type memory operand of the form vm32{x,y,z} identifies a vector array of memory operands specified using SIB type memory addressing. In this example, the array of memory addresses is specified using a common base register, a constant scaling factor, and a vector index register containing individual elements, each of which is a 32-bit index value. In some embodiments, the vector index register is a 128-bit register (e.g., XMM) register (vm32x), a 256-bit (e.g., YMM) register (vm32y), or a 512-bit (e.g., ZMM) register (vm32z). In another embodiment, an SIB type memory operand of the form vm64{x,y,z} identifies a vector array of memory operands specified using SIB type memory addressing. In this example, the array of memory addresses is specified using a common base register, a constant scaling factor, and a vector index register containing individual elements, each of which is a 64-bit index value. In one embodiments, the vector index register is a 128-bit register (e.g., XMM) register (vm64x), a 256-bit (e.g., YMM) register (vm64y) or a 512-bit (e.g., ZMM) register (vm64z).

In one embodiment, COUNT is a field of the TLDEXPAND instruction which is to provide a third operand which identifies a total number of elements of the compressed matrix data 101. In one such embodiment, the third operand is an immediate value. In other embodiments, the TLDEXPAND instruction omits the COUNT field—e.g., wherein execution circuitry 110 is able to generate decompressed matrix data 103, based on compressed matrix data 101 and metadata 102, by evaluating the total number of elements in metadata 102 without the TLDEXPAND instruction providing an explicit identifier of said total number.

In an illustrative scenario according to one embodiment, execution of the TLDEXPAND instruction comprises transceiver circuitry 112 of execution circuitry 110 accessing the source location in repository 120 which is indicated by the operand in the field TSIB. Such accessing comprises or otherwise results in transceiver circuitry 112 loading, into calculation circuitry 114 of execution circuitry 110, data (such as the illustrative compressed matrix data 101 shown) which includes a compressed version of a matrix. In an embodiment, this accessing of repository 120 further comprises or otherwise results in transceiver circuitry 112 loading into calculation circuitry 114 metadata 102 which corresponds to the matrix represented by compressed matrix data 101.

In some embodiments, the opcode of the TLDEXPAND instruction—and/or the particular number identified by the third operand in the COUNT field—further indicate to transceiver circuitry 112 the particular amount of data to be retrieved from the location(s) in repository 120 which is/are indicated by the second operand in the TSIB field. By way of illustration and not limitation, in one such embodiment, transceiver circuitry 112 (or other suitable logic of the execution circuitry 110) determines, based on an opcode of the single instruction, that the matrix comprises elements which are of a particular size—e.g., wherein the matrix includes byte-sized elements or word-sized elements (or any of various other sized element). With such information, transceiver circuitry 112 provides one or more addresses to retrieve, and to load to calculation circuitry 114, compression information comprising compressed matrix data 101 and metadata 102.

With compressed matrix data 101 and metadata 102, calculation circuitry 114 performs one or more decompression operations to obtain decompressed matrix data 103 which comprises a decompressed version of the matrix. By way of illustration and not limitation, metadata 102 comprises compression mask information, such as a bitmap or other suitable data structure, which represents the respective locations of those one or more entries in the matrix which were previously removed (or "masked") by compression operations which generated compressed matrix data 101. For example, bits of such compression mask information each correspond to a different respective element of decompressed matrix data 103, wherein, for each such bit, a respective value of the bit determines whether the corresponding element of decompressed matrix data 103 is to be equal to some default value (e.g., zero), or rather, is to be equal to a value which is specified or otherwise indicated by compressed matrix data 101.

After being generating by calculation circuitry 114, the decompressed matrix data 103 is provided to the destination location which is indicated by the first operand in the TDEST field of the TLDEXPAND instruction. In one such embodiment, the opcode of the TLDEXPAND instruction indicates to execution circuitry 110 a hint as to whether the decompressed matrix data 103 is available to be additionally or alternatively provided to another location. For example, such a hint may indicate whether decompressed matrix data 103 is a candidate to be additionally or alternatively provided to a particular cache—e.g., wherein such additional or alternative provisioning is limited to one or more types of caches, but not one or more other types of caches.

Figure 2:
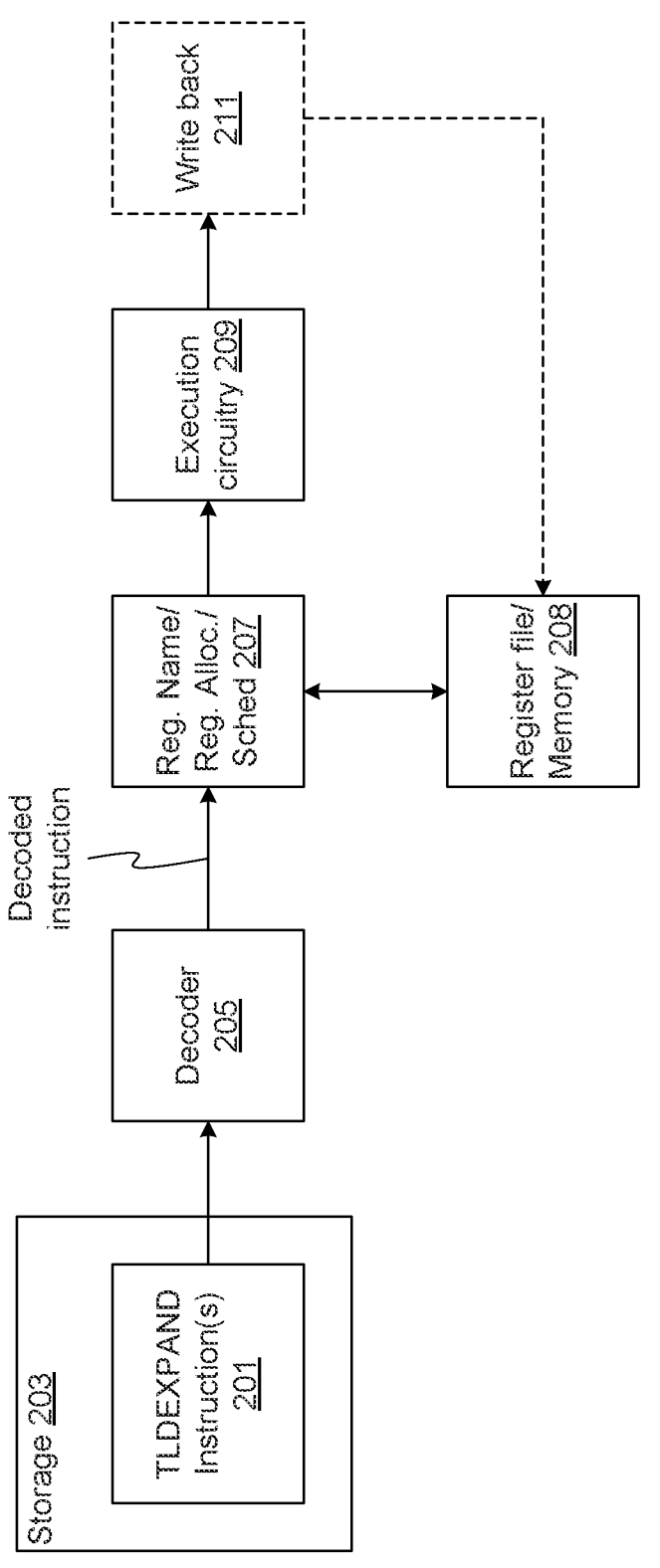
FIG. 2 illustrates features of a device to process a matrix decompression instruction according to an embodiment.

FIG. 2 illustrates examples of hardware to process an instruction, such as TLDEXPAND instruction, to load and decompress matrix information. As illustrated, storage 203 stores a TLDEXPAND instruction 201 to be executed.

The instruction 201 is received by decoder circuitry 205. For example, the decoder circuitry 205 receives this instruction from fetch circuitry (not shown). The instruction may be in any suitable format, such as that describe with reference to FIG. 17 below. In an example, the instruction includes fields for an opcode, a first operand which indicates a destination location to receive uncompressed matrix data, and a second operand which indicates a source location from which compressed matrix data and metadata are to be retrieved. In various embodiments, the instruction further includes a field for a third operand which identifies a total number of elements of the compressed matrix data.

In some examples, one or both of the source location and the destination location are each a respective register, and in other examples one or both of the source location and the destination location are each a respective memory location. In some examples, the third operand is an immediate operand. In some examples, the opcode details one or more characteristics of the load and expand operations to be performed.

More detailed examples of at least one instruction format for the instruction will be detailed later. The decoder circuitry 205 decodes the instruction into one or more operations. In some examples, this decoding includes generating a plurality of micro-operations to be performed by execution circuitry (such as execution circuitry 209). The decoder circuitry 205 also decodes one or more instruction prefixes, in some embodiments.

In some examples, register renaming, register allocation, and/or scheduling circuitry 207 provides functionality for one or more of: 1) renaming logical operand values to physical operand values (e.g., a register alias table in some examples), 2) allocating status bits and flags to the decoded instruction, and 3) scheduling the decoded instruction for execution by execution circuitry out of an instruction pool (e.g., using a reservation station in some examples).

Registers (register file) and/or memory 208 store data as operands of the instruction to be operated on by execution circuitry 209. Exemplary register types include packed data registers, general purpose registers (GPRs), and floating-point registers.

Execution circuitry 209 executes the decoded instruction. Exemplary detailed execution circuitry includes execution circuitry 110 shown in FIG. 1, and execution cluster(s) 1460 shown in FIG. 14B, etc. The execution of the decoded instruction causes the execution circuitry (or an accelerator circuit coupled to the execution circuitry) to load both compressed matrix data, and metadata corresponding thereto, and to generate decompressed matrix data based on said information. In some examples, retirement/write back circuitry 211 architecturally commits the destination register into the registers or memory 208 and retires the instruction.

An example of a format for an TLDEXPAND instruction is OPCODE DST, SRC1, IMM. In some examples, OPCODE is the opcode mnemonic of the instruction. DST is a field for the destination operand, such as packed data register or memory. SRC1 is a field for a source operand, such as a packed data register and/or a memory. IMM is a field for an immediate value operand, such as a count operand described herein.

FIG. 3 illustrates an example of method performed by a processor to process a TLDEXPAND instruction. For example, a processor core as shown in FIG. 14B, a pipeline as detailed below, etc., performs this method.

At 301, an instance of single instruction is fetched. For example, a TLDEXPAND instruction is fetched. The instruction includes fields for an opcode, a destination operand which indicates a location to receive uncompressed matrix data, and a source operand which indicates a location from which compressed matrix data and metadata are to be retrieved. By way of illustration and not limitation, the destination operand or the source operand provides an addressing which (for example) has one or more of the features shown in the addressing field 1705 described herein. In various embodiments, the instruction further includes a field for an immediate value operand which identifies a total number of elements of the compressed matrix data. In some examples, the instruction is fetched from an instruction cache. The opcode indicates load and expand to perform.

The fetched instruction is decoded at 303. For example, the fetched TLDEXPAND instruction is decoded by decoder circuitry such as decoder circuitry 205 or decode circuitry 1440 detailed herein. Data values associated with the source operand of the decoded instruction are retrieved when the decoded instruction is scheduled at 305. For example, when the source operand is a memory operand, the data from the indicated memory location is retrieved.

At 307, the decoded instruction is executed by execution circuitry (hardware) such as execution circuitry 110 shown in FIG. 1, execution circuitry 209 shown in FIG. 2, or execution cluster(s) 1460 shown in FIG. 14B. For the TLDEXPAND instruction, the execution will cause execution circuitry to perform the operations described in connection with FIG. 1. In various examples, the operations include loading, from the location indicated by the source location, both compressed matrix data and metadata which corresponds to the compressed matrix data. Furthermore, the operations comprise executing a decompression operation to obtain decompressed matrix data based on the load compressed matrix data and the metadata. Further still, the operations comprise providing the decompressed matrix data to the destination location. In some examples, the instruction is committed or retired at 309.

FIG. 4 illustrates an example of method to process a TLDEXPAND instruction using emulation or binary translation. For example, a processor core as shown in FIG. 14B, a pipeline and/or emulation/translation layer perform aspects of this method.

An instance of a single instruction of a first instruction set architecture is fetched at 401. The instance of the single instruction of the first instruction set architecture including fields for an opcode, a destination operand which indicates a location to receive uncompressed matrix data, and a source operand which indicates a location from which compressed matrix data and metadata are to be retrieved. By way of illustration and not limitation, the destination operand or the source operand provides an addressing which (for example) has one or more of the features shown in the addressing field 1705 described herein. In various embodiments, the instruction further includes a field for an immediate value operand which identifies a total number of elements of the compressed matrix data. In some examples, the instruction is fetched from an instruction cache. The opcode indicates load and expand to perform.

Figure 23:
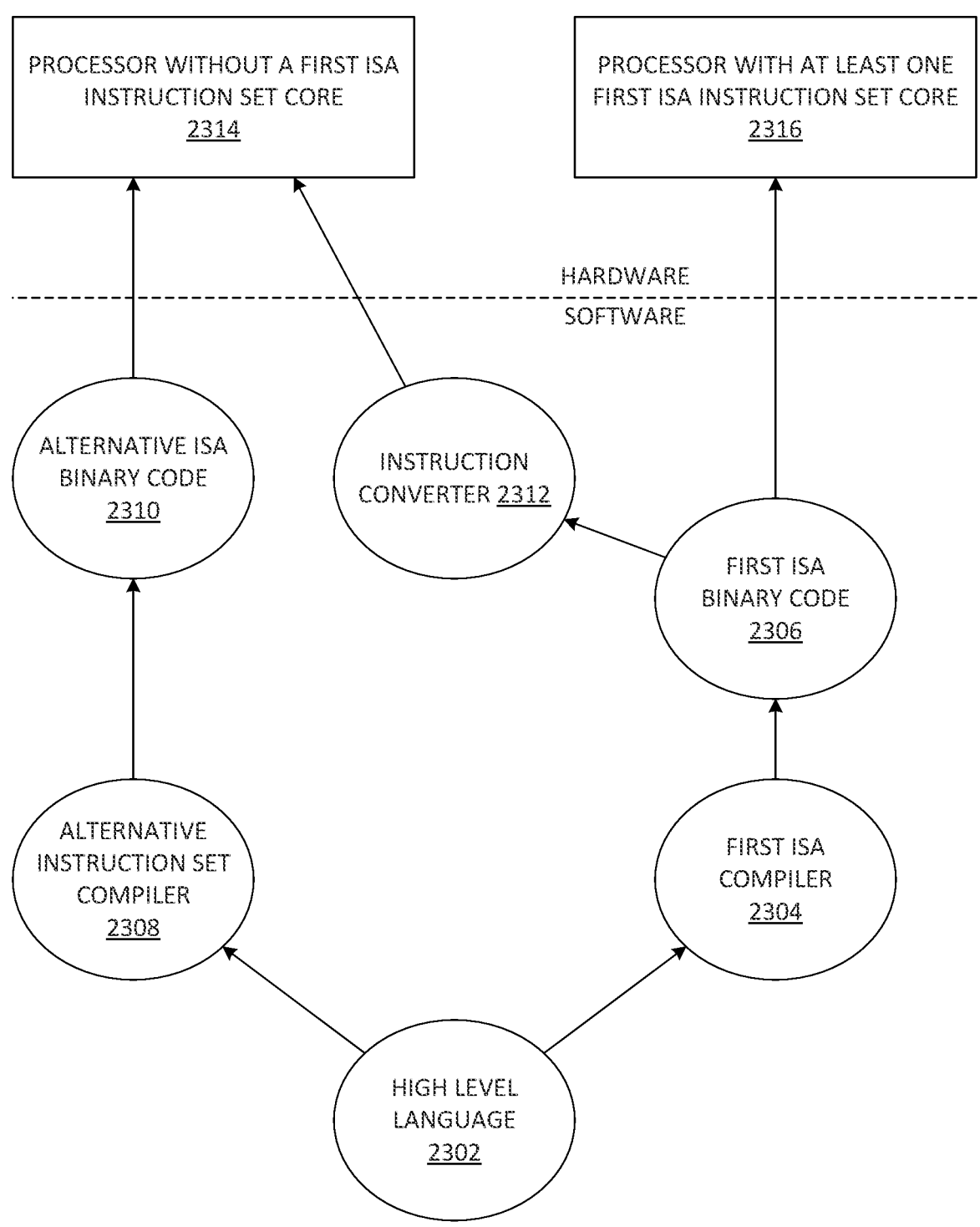
FIG. 23 is a block diagram illustrating the use of a software instruction converter to convert binary instructions in a source instruction set architecture to binary instructions in a target instruction set architecture according to examples.

The fetched single instruction of the first instruction set architecture is translated into one or more instructions of a second instruction set architecture at 402. This translation is performed by a translation and/or emulation layer of software in some examples. In some examples, this translation is performed by an instruction converter 2312 as shown in FIG. 23. In some examples, the translation is performed by hardware translation circuitry.

The one or more translated instructions of the second instruction set architecture are decoded at 403. For example, the translated instructions are decoded by decoder circuitry such as decoder circuitry 205 or decode circuitry 1440 detailed herein. In some examples, the operations of translation and decoding at 402 and 403 are merged.

Data values associated with the source operand(s) of the decoded one or more instructions of the second instruction set architecture are retrieved and the one or more instructions are scheduled at 405. For example, when one or more of the source operands are memory operands, the data from the indicated memory location is retrieved.

At 407, the decoded instruction(s) of the second instruction set architecture is/are executed by execution circuitry (hardware) such as execution circuitry 109 shown in FIG. 1, execution circuitry 209 shown in FIG. 2, or execution cluster(s) 1460 shown in FIG. 14B, to perform the operation(s) indicated by the opcode of the single instruction of the first instruction set architecture. For the TLDEXPAND instruction, the execution will cause execution circuitry to perform the operations described in connection with FIG. 1. In various examples, the operations include loading, from the location indicated by the source operand, both compressed matrix data and metadata which corresponds to the compressed matrix data. Furthermore, the operations comprise executing a decompression operation to obtain decompressed matrix data based on the load compressed matrix data and the metadata. Further still, the operations comprise providing the decompressed matrix data to the destination location.

In some examples, the instruction is committed or retired at 409.

Figure 5:
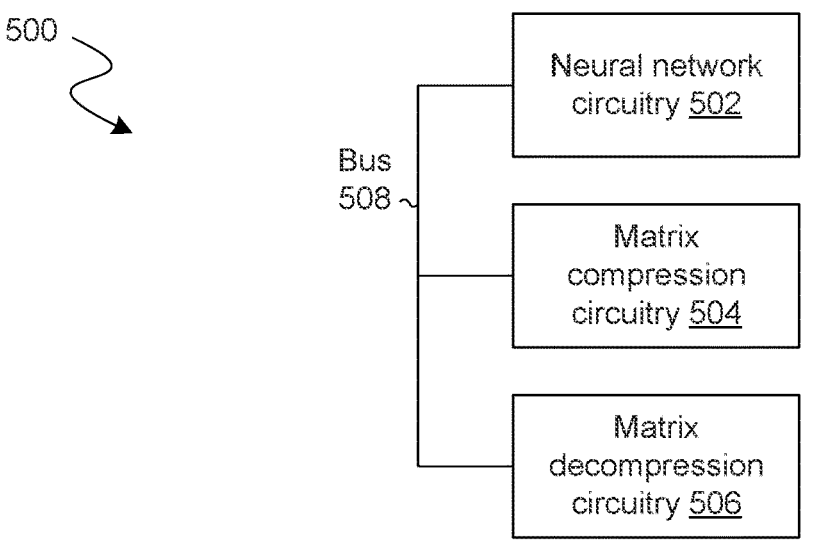
FIG. 5 shows a functional block diagram illustrating features of system to provide matrix information which is decompressed according to an embodiment.

FIG. 5 illustrates an example system 500 in accordance with examples disclosed herein. In FIG. 5, the system 500 includes neural network circuitry 502, matrix compression circuitry 504, and matrix decompression circuitry 506. In FIG. 5, the neural network circuitry 502, the matrix compression circuitry 504, and the matrix decompression circuitry 506 are communicatively coupled via a bus 508.

In the illustrated example of FIG. 5, the neural network circuitry 502 includes or otherwise has access to weight matrices (e.g., tiles) associated with a deep learning model. Accordingly, the neural network circuitry 502 can obtain inferences based on the weight matrices associated with the deep learning model. In FIG. 5, in response to the deep learning model being trained, the neural network circuitry 502 transmits the weight matrices to the matrix compression circuitry 504.

In the illustrated example of FIG. 5, the matrix compression circuitry 504 executes a compression process to obtain compressed data corresponding to weights in the weight matrices. Additionally, the matrix compression circuitry 504 determines metadata associated with the compressed data and/or the weight matrices, as discussed further in examples disclosed herein. In FIG. 5, the matrix compression circuitry 504 transmits the compressed data and the metadata to the matrix decompression circuitry 506.

In some examples, the matrix compression circuitry 504 is disconnected from the bus 508 in response to transmitting the compressed data and the metadata to the matrix decompression circuitry 506. For example, the matrix compression circuitry 504 can compress the weight matrices during an installation process associated with the neural network circuitry 502. Accordingly, the matrix decompression circuitry 506 can receive the compressed data and the metadata for usage.

In the illustrated example of FIG. 5, an execution of an instruction comprises the matrix decompression circuitry 506 decompression of at least a portion of the compressed data to obtain one or more of the weight matrices—e.g., based on a request from the neural network circuitry 502. For example, the request from neural network circuitry 502 can include or otherwise result in an execution of the instruction, which specifies or otherwise indicates an address of a respective weight matrix. In FIG. 5, the matrix decompression circuitry 506 decompresses the compressed data based on the metadata, as discussed further in examples disclosed herein. In FIG. 5, the matrix decompression circuitry 506 transmits the uncompressed data to the neural network circuitry 502 (or to a repository which is accessible to neural network circuitry 502), which, in turn, can perform an inference based on a received input(s).

Figure 6:
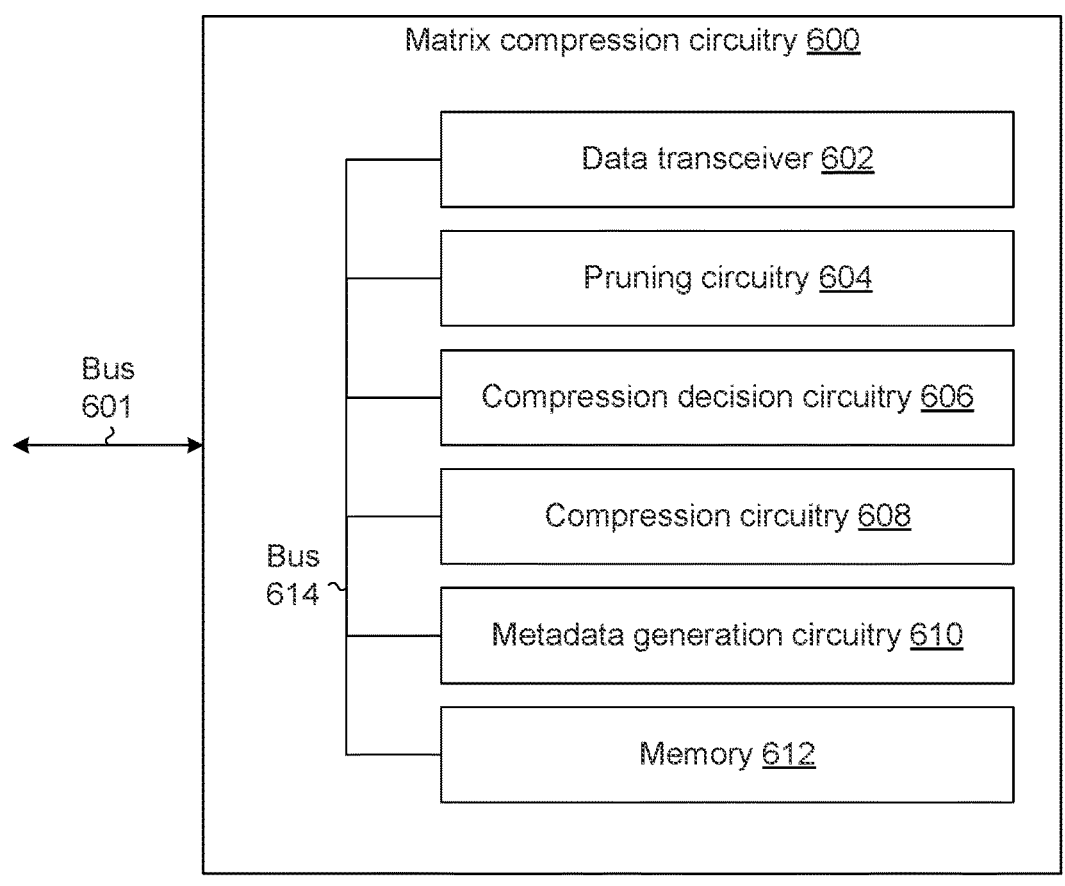
FIGS. 6 and 7 show functional block diagrams illustrating features of respective circuits to provide matrix compression information each according to a corresponding embodiment.

FIG. 6 illustrates the example matrix compression circuitry 600 (such as matrix compression circuitry 504 of FIG. 5). In FIG. 6, the matrix compression circuitry 600 includes a data transceiver 602, pruning circuitry 604, compression decision circuitry 606, compression circuitry 608, metadata generating circuitry 610, and a memory (e.g., a linear memory, a DRAM, etc.) 612. In FIG. 6, the data transceiver 602, the pruning circuitry 604, the compression decision circuitry 606, the compression circuitry 608, the metadata generating circuitry 610, and the memory 612 are communicatively coupled via a bus 614.

In the illustrated example of FIG. 6, the data transceiver 602 receives weight matrices from circuitry, such as neural network circuitry 502, via a bus 601. In turn, the data transceiver 602 can transmit the weight matrices to the pruning circuitry 604. In FIG. 6, the data transceiver 602 transmits compressed data and metadata associated with the compressed data to the matrix decompressing circuitry 506 (for example). In one such embodiment, the data transceiver 602 transmits data in the memory 612 to the matrix decompressing circuitry 506.

In the illustrated example of FIG. 6, the pruning circuitry 604 prunes weights in the weight matrices. For example, the pruning circuitry 604 can prune the weights in the weight matrices that are equal to a predetermined value, below a threshold value, or the like. The deep learning model associated with the neural network circuitry 502 is trained to re-learn the weights that are below the threshold during a training period. As such, an accuracy of the deep learning model is maintained with pruning. In FIG. 6, the pruning circuitry 604 transmits the weight matrices to the compression decision circuitry 606. In other embodiments, matrix compression circuitry 600 omits pruning circuitry 604.

In the illustrated example of FIG. 6, the compression decision circuitry 606 determines whether the respective weight matrices are compressible and, if so, which compression process to utilize. For example, the compression decision circuitry 606 can determine whether a weight matrix is compressible based on weights in the weight matrix and/or potential space savings that would result from compressing the weight matrix. In some examples, the compression decision circuitry 606 identifies a quantity of weights in the weight matrix having a value of zero (e.g., in response to the pruning circuitry 604 pruning the weight matrix). For example, the compression decision circuitry 606 can compare the weights in the weight matrix having a value of zero to a weight threshold (e.g., four weights, five weights, six weights, etc.). Further, the compression decision circuitry 606 can decide not to compress the weight matrix in response to the weight matrix having less weights with a value of zero than the weight threshold. Specifically, the compression decision circuitry 606 determines space savings that would result from compressing the weight matrix would be less than a threshold (e.g., one byte). In turn, the compression decision circuitry 606 accelerates collective compression of the weight matrices by skipping compression operations that would otherwise result in insignificant space savings (e.g., less than one byte). In turn, the compression decision circuitry 606 can transmit the weight matrix to the metadata generation circuitry 610 and/or the memory 612. In some examples, the compression decision circuitry 606 transits a signal indicative of the weight matrix being uncompressed to the metadata generation circuitry 610.

In the illustrated example of FIG. 6, the compression decision circuitry 606 determines a compression process to be executed by the compression circuitry 608. In some examples, the compression decision circuitry 606 determines the compression process to be executed by the compression circuitry 608 based on the weights in the weight matrix. For example, the compression decision circuitry 606 can determine the compression circuitry 608 is to execute a first compression process (e.g., "zero compression") in response to the weight matrix including at least one weight having a non-zero value. In some examples, the compression decision circuitry 606 determines the compression circuitry 608 is to execute a second compression process (e.g., "all zero") in response to the weights of the weight matrix all having values of zero. In FIG. 6, the compression decision circuitry 606 transmits a signal indicative of the compression process to be executed to the compression circuitry 608 and the metadata generation circuitry 610.

In the illustrated example of FIG. 6, the compression circuitry 608 compresses the weight matrices. In FIG. 6, the compression circuitry 608 executes the compression process determined by the compression decision circuitry 606 to compress the respective weight matrices. For example, the compression circuitry 608 can execute a first function to implement the first compression process in response to receiving a first signal via the compression decision circuitry 606. Further, the compression circuitry 608 can execute a second function to implement the second compression process in response to receiving a second signal via the compression decision circuitry 606. In some examples, when the compression circuitry 608 executes the first compression process, the compression circuitry 608 is to generate a bitmap indicative of respective locations of the weights in a weight matrix. For example, the compression circuitry 608 generates for each byte (or each word, for example) in the weight matrix a respective corresponding bit in the bitmap. Further, the compression circuitry 608 is to pack non-zero weights in the weight matrix into a compressed array.

In FIG. 6, the compression circuitry 608 transmits compressed data (and, for example, a bitmap or other suitable metadata) to the metadata generation circuitry 610 and/or to the memory 612. In FIG. 6, the compression circuitry 608 stores the compressed data for consecutive weight matrices in consecutive sets of cache lines in the memory 612. In some examples, the compression circuitry 608 stores the bitmap in an initial one or more cache lines of a set of cache lines for the respective weight matrix. In such examples, the compression circuitry 608 stores the dense array in one or more cache lines subsequent to the initial one or more bitmap cache lines in the set of cache lines for the respective weight matrix.

In the illustrated example of FIG. 6, the metadata generation circuitry 610 determines any of various other types of metadata for the compressed data. For example, the metadata generation circuitry 610 can generate one or more additional bytes of metadata for the compressed data associated with the respective weight matrices. In some examples, metadata generation circuitry 610 indicates a size of the compressed data and/or a method according to which the respective weight matrix was compressed in the metadata, as discussed further in association with FIG. 7. In FIG. 6, the metadata generation circuitry 610 stores the metadata via the memory 612. In one example embodiment, the metadata generation circuitry 610 stores the metadata for the respective weight matrices in a leading cache line of the memory 612.

In the illustrated example of FIG. 6, the memory 612 stores the metadata and the compressed data. In FIG. 6, the memory 612 is a linear memory. In FIG. 6, the memory 612 organizes the metadata and the compressed data by cache lines. For example, a first cache line of the memory 612 can include the metadata for each of the respective weight matrices. Additionally, the memory 612 can include the compressed data associated with a first weight matrix in a first set of cache lines positioned after the first cache line. Likewise, the memory 612 can include the compressed data associated with a second weight matrix in a second set of cache lines positioned after the first set of cache lines. Moreover, the first cache line of the memory 612 includes the metadata associated with the first weight matrix followed by the metadata for the second weight matrix to enable mapping between the metadata and the associated compressed data.

Figure 7:
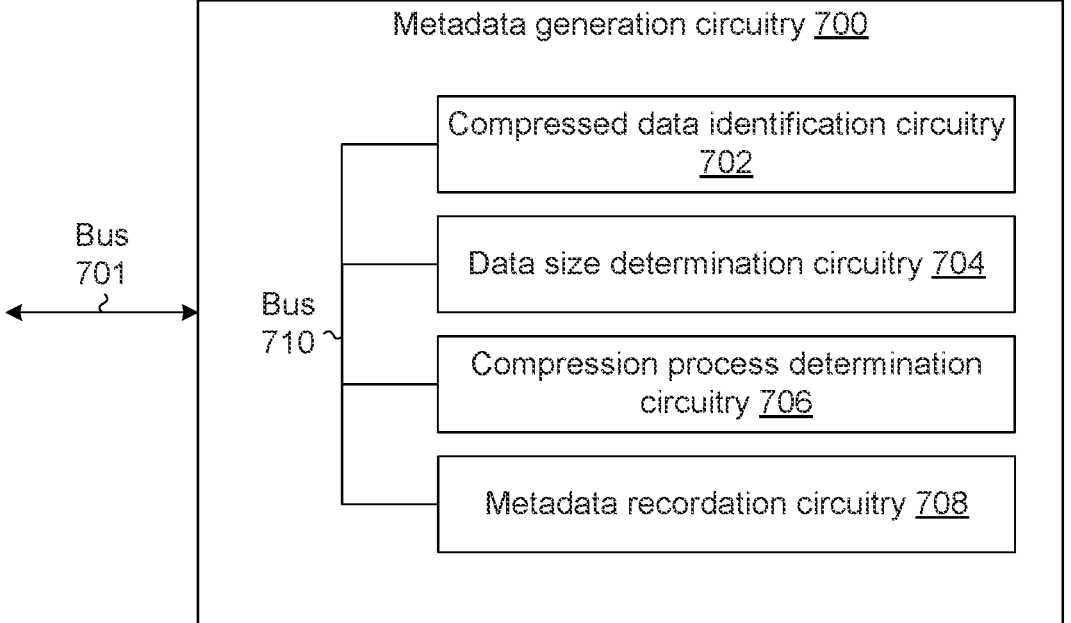

FIG. 7 illustrates the metadata generation circuitry 700 (such as metadata generation circuitry 610 of FIG. 6, for example). In the illustrated example of FIG. 7, the metadata generation circuitry 700 includes compressed data identification circuitry 702, data size determination circuitry 704, compression process determination circuitry 706, and metadata recordation circuitry 708. In the illustrated example of FIG. 7, the compressed data identification circuitry 702, the data size determination circuitry 704, the compression process determination circuitry 706, and the metadata recordation circuitry 708 are communicatively coupled via a bus 710—e.g., wherein metadata generation circuitry 700 is to be coupled to one or more other matrix compression resources (not shown) via a bus 701, such as bus 614.

In some examples, the metadata generation circuitry 700 is coupled to receive compressed data (e.g., from the compression circuitry 608) and/or accesses the compressed data via a memory (such as memory 612) in response to a weight matrix being compressed. In some examples, the metadata generation circuitry 700 receives a signal—e.g., via the compression decision circuitry 606—which is indicative of a compression process executed to obtain the compressed data. In some examples, the metadata generation circuitry 700 receives the weight matrix and/or a signal indicative of the weight matrix being compressed.

In the illustrated example of FIG. 7, the compressed data identification circuitry 702 determines whether the received data is compressed. In FIG. 7, the compressed data identification circuitry 702 can determine the data is compressed in response to receiving the data via the compression circuitry 608 and/or in response to receiving the signal indicative of the compression process via the compression decision circuitry 606. In FIG. 7, the compressed data identification circuitry 702 determines the data is uncompressed in response to receiving the data via the compression decision circuitry 606 or in response to not receiving the data via the compression circuitry 608. In some examples, the compressed data identification circuitry 702 determines the data is uncompressed in response to receiving a signal indicative of the weight matrix being uncompressed via the compression decision circuitry 606. In FIG. 7, the compressed data identification circuitry 702 indicates whether the data is compressed to the metadata recordation circuitry 708.

In the illustrated example of FIG. 7, the data size determination circuitry 704 determines a size of the data in response to the data being compressed. In some examples, when the data is compressed, the data size determination circuitry 704 determines a cache size of the data in response to receiving the data via the compression circuitry 608 and/or accessing the data via the memory 612. For example, the data size determination circuitry 704 can determine a quantity of cache lines occupied by the data. In FIG. 7, the data size determination circuitry 704 transmits a signal indicative of the quantity of cache lines occupied by the weight matrix to the metadata recordation circuitry 708.

In some examples, the data size determination circuitry 704 determines whether the data is compressed based on the cache size of the data. For example, the data size determination circuitry 704 can determine the data is uncompressed in response to the data occupying a predetermined cache size (e.g., an original size of the weight matrix) associated with an uncompressed weight matrix, such as sixteen cache lines. Accordingly, when the cache size of the data is smaller than the predetermined cache size, the data size determination circuitry 704 determines the data is compressed. In some examples, the data size determination circuitry 704 transmits a signal indicative of whether the data is compressed to the metadata recordation circuitry 708.

In the illustrated example of FIG. 7, the compression process determination circuitry 706 determines the process executed to compress the weight matrix. In FIG. 7, the compression process determination circuitry 706 determines the executed compression process based on the signal indicative of the compression process received via compression decision circuitry 606. In some examples, the compression process determination circuitry 706 analyzes the compressed weight matrix to determine the executed compression process. For example, the compression process determination circuitry 706 can determine an "all zero" compression process was executed to obtain the compressed weight matrix in response to the weight matrix only including weights having a value of zero. Further, the compression process determination circuitry 706 can determine a "zero compression" process was executed to obtain a compressed weight matrix including a dense array of weights having non-zero values. In FIG. 7, the compression process determination circuitry 706 transmits a signal indicative of the compression process executed to obtain the data to the metadata recordation circuitry 708.

In FIG. 7, the metadata recordation circuitry 708 generates, receives or otherwise determines metadata corresponding to the compressed matrix data. By way of illustration and not limitation, the metadata recordation circuitry 708 determines a bitmap comprising bits which each correspond to a different respective element of the weight matrix. In one such embodiment, each bit of the bitmap indicates whether the corresponding element of the weight matrix has some predetermined default value (e.g., zero) or, alternatively, has a value which is represented in the compressed matrix data.

FIG. 8 shows decompression operations 800 which are performed in the execution of a tile load and expand instruction (e.g., a TLDEXPAND instruction) according to an embodiment. In some embodiments, decompression operations 800 are performed with execution circuitry 110 or execution circuitry 209, for example.

In an embodiment, decompression operations 800 include or are otherwise based on a retrieval of compressed matrix data 810 and metadata (such as the illustrative compression mask information 820 shown) which corresponds to compressed matrix data 810. In one such embodiment, compressed matrix data 810 and compression mask information 820 are variously generated or otherwise provided (for example) by matrix compression circuitry 600 and/or metadata generation circuitry 700.

In one example embodiment, compressed matrix data 810 is retrieved from a first location which is specified or otherwise indicated by a first operand of a tile load and expand instruction instruction. Furthermore, compression mask information 820 is retrieved from a second location which is specified or otherwise indicated by a second operand of the tile load and expand instruction instruction.

Execution of a tile load and expand instruction instruction, in some embodiments, includes the performance of one or more operations (represented as the decompression operations 800 shown) to generate—based on compressed matrix data 810 and compression mask information 820—decompressed matrix data 830 comprising a decompressed version of a tile which is represented by compressed matrix data 810. For example, compressed matrix data 810, compression mask information 820 and decompressed matrix data 830 correspond (respectively) to compressed matrix data 101, metadata 102 and decompressed matrix data 103.

In FIG. 8, compressed matrix data 810 is shown both as a dense tile, and as an ordered sequence of the nine elements of said dense tile. Furthermore, compression mask information 820 is shown both as a bitmap matrix (in this example, a 4×4 bitmap matrix) and as an ordered sequence of the sixteen bits of said bitmap matrix. Further still, decompressed matrix data 830 is shown both as a weight matrix (in this example, a 4×4 weight matrix) and as an ordered sequence of the sixteen elements of said weight matrix. In various embodiments, decompression operations 800 is based on such an ordering of elements and bits.

By way of illustration and not limitation, the bitmap matrix of compression mask information 820 represents the respective locations of those one or more entries in the original weight matrix which were removed (or "masked") by the compression operations which generated compressed matrix data 810. For example, the bits of compression mask information 820 each correspond to a different respective element of decompressed matrix data 830, wherein, for each such bit, a respective value of the bit determines whether the corresponding element of decompressed matrix data 830 is to be equal to some default value (e.g., zero), or rather, is to be equal to a value which is specified or otherwise indicated by compressed matrix data 810.

By way of illustration and not limitation, where a bit of compression mask information 820 is equal to zero ("0"), the corresponding element of decompressed matrix data 830 is to be equal to zero ("0"). By contrast, where that same bit of compression mask information 820 is instead equal to one ("1"), the corresponding element of decompressed matrix data 830 is to be equal to one of the elements indicated by compression mask information 820—e.g., a next available element in a sequential order of the element indicated by compression mask information 820.

In an illustrative scenario according to one embodiment, the value of a first bit of compression mask information 820—e.g., wherein the value is equal to one ("1")—indicates that the corresponding first element of decompressed matrix data 830 is to be equal to the value of the first element of compressed matrix data 810. In the example embodiment, this first element of compressed matrix data 810 also happens to be equal to one ("1"). Furthermore, the "1" value of a second bit of compression mask information 820 similarly indicates that the corresponding second element of decompressed matrix data 830 is to be equal to the value of a next element—i.e., the second element—in an ordered sequence of the elements represented in compressed matrix data 810. Further still, the "1" value of a third bit of compression mask information 820 similarly indicates that the corresponding third element of decompressed matrix data 830 is to be equal to the value of a next element—i.e., the third element—in the ordered sequence of the elements represented in compressed matrix data 810.

By contrast, the "0" value of a fourth bit of compression mask information 820 instead indicates that the corresponding fourth element of decompressed matrix data 830 is to be equal to zero ("0"). Furthermore, the "1" value of a fifth bit of compression mask information 820 indicates that the corresponding fifth element of decompressed matrix data 830 is to be equal to the value of a next element—i.e., the fourth element—in an ordered sequence of the elements represented in compressed matrix data 810. The other elements of decompressed matrix data 830 are similarly determined based on compressed matrix data 810 and compression mask information 820.

Figure 9:
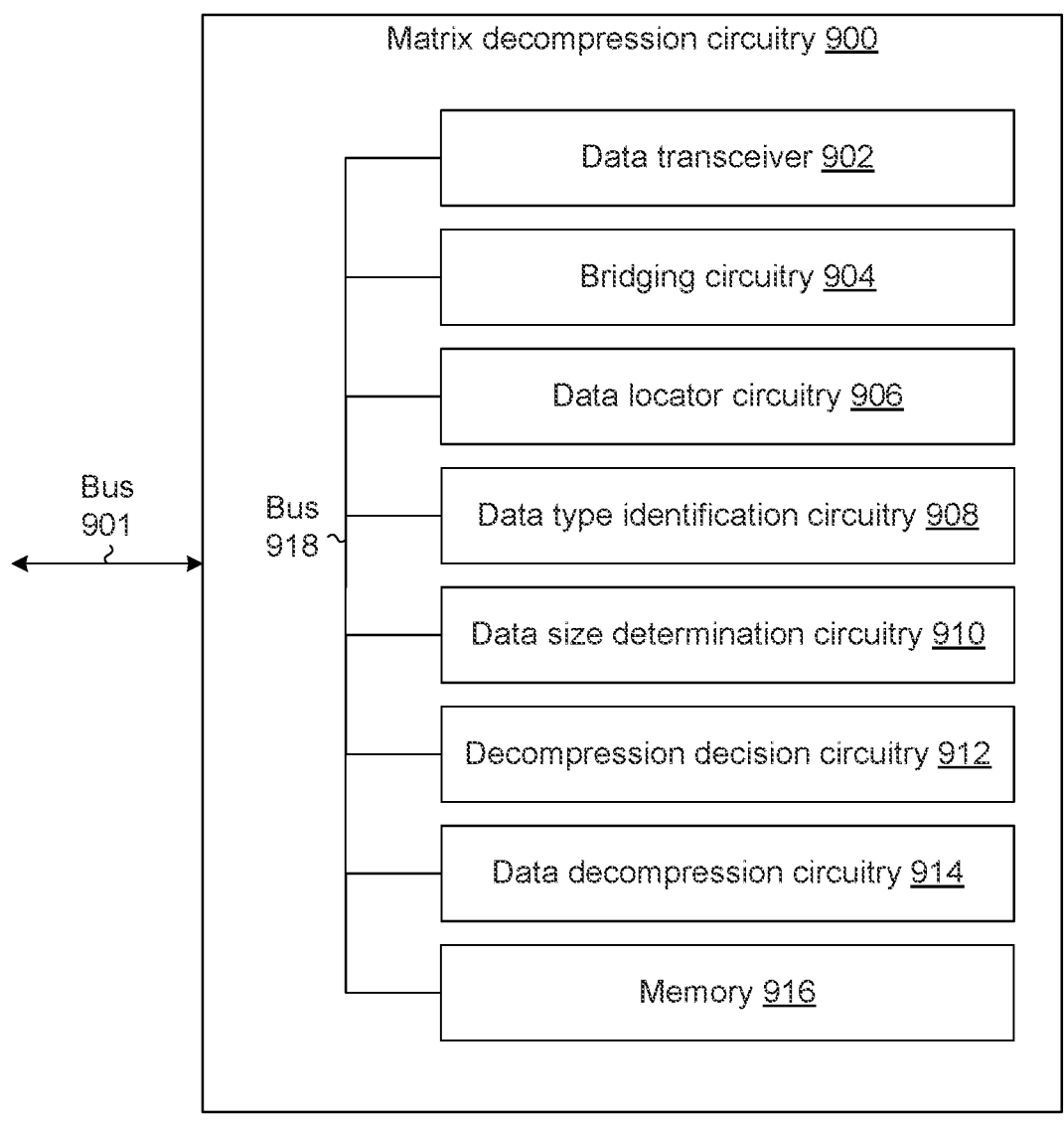
FIG. 9 shows a functional block diagram illustrating features of a matrix decompression circuit according to an embodiment.

FIG. 9 illustrates an example of matrix decompression circuitry 900 (such as the matrix decompression circuitry 506 of FIG. 5) according to an embodiment. In FIG. 9, the matrix decompression circuitry 900 includes a data transceiver 902, bridging circuitry 904, data locator circuitry 906, data type identification circuitry 908, data size determination circuitry 910, decompression decision circuitry 912, data decompression circuitry 914, and memory 916. In FIG. 9, the data transceiver 902, the bridging circuitry 904, the data locator circuitry 906, the data type identification circuitry 908, the data size determination circuitry 910, the decompression decision circuitry 912, and the data decompression circuitry 914 are communicatively coupled via a bus 918— e.g., wherein matrix decompression circuitry 900 is to couple to matrix compression circuitry (e.g., matrix compression circuitry 504) via a bus 901.

In FIG. 9, the data transceiver 902 receives data corresponding to neural network weights from matrix compression circuitry (not shown) via the bus 901. In an embodiment, the execution of a TLDEXPAND instruction includes or otherwise results in the data transceiver 902 receiving compressed matrix data which (for example) is stored in the memory 612 of the matrix compression circuitry 600. Furthermore, such execution includes or otherwise results in the data transceiver 902 receiving compression mask information (or other suitable metadata) which corresponds to the compressed matrix data. In FIG. 9, in response to the data being decompressed with the matrix decompression circuitry 900, the data transceiver 902 transmits the data via the bus 901 to a location which is indicated by a destination operand of the TLDEXPAND instruction.

In FIG. 9, the bridging circuitry 904 determines metadata (e.g., the metadata 102) associated with a tile based on the TLDEXPAND instruction being executed. For example, the bridging circuitry 904 can determine the metadata associated with the tile based on an address of the tile. In FIG. 9, the bridging circuitry 904 can correlate the address of the tile with the byte of metadata associated with the tile. For example, the address of the tile can be a tile number and the bridging circuitry 904 can determine the byte of metadata that corresponds to the tile number. That is, in response to receiving a request for a first tile in a set of tiles, the bridging circuitry 904 can identify a first byte of metadata. In some examples, the bridging circuitry 904 identifies the metadata via the memory 916.

In an embodiment, data locator circuitry 906 determines a location of the tile based on a SIB operand (or other suitable operand) of the TLDEXPAND instruction. In one such embodiment, the data type identification circuitry 908 identifies whether the tile is compressed. For example, the data type identification circuitry 908 can determine whether the tile is compressed based on a portion of the metadata associated with the tile. In one such embodiment, the data type identification circuitry 908 identifies that the tile is compressed in response to a dedicated bit of the metadata including a first value (e.g., 1). Similarly, the data type identification circuitry 908 identifies that the tile is uncompressed in response to the dedicated bit of the metadata including a second value (e.g., 0).

In an embodiment, the data size determination circuitry 910 determines a size of the tile. For example, in response to the tile being compressed, the data size determination circuitry 910 can determine the size of the tile based on metadata, associated with the tile, which specifies or otherwise indicates a quantity of cache (or other memory) lines that the tile occupies.

In an embodiment, in response to the tile being compressed, the decompression decision circuitry 912 determines a compression process executed to obtain the tile. For example, the decompression decision circuitry 912 can determine the compression process executed by the matrix compression circuitry 504 based on another portion of the metadata associated with the tile. In some examples, the decompression decision circuitry 912 determines the executed compression process based on a value indicated by three bits of the metadata. For example, the decompression decision circuitry 912 can correlate the value indicated by the last three bits to a compression process associated with the value. For example, the decompression decision circuitry 912 can determine a first, second, third, fourth, fifth, sixth, seventh, or eighth compression process was executed by the matrix compression circuitry 504 in response to the last three bits of the metadata indicating a first value, a second value, a third value, a fourth value, a fifth value, a sixth value, a seventh value, or an eighth value, respectively. By way of illustration and not limitation, "zero compression" may be linked to the first value, "all zero" compression may be linked to the second value, and additional compression processes may be linked to the third value, the fourth value, the fifth value, the sixth value, the seventh value, and the eighth value.

In an embodiment, data decompression circuitry 914 decompress the tile based, for example, on the size of the compressed tile and the compression process executed by the matrix compression circuitry 504 to obtain the compressed tile. In an embodiment, the data decompression circuitry 914 accesses the compressed tile in the memory 916 based on the determined location and the size of the compressed tile. In turn, the data decompression circuitry 914 can decompress the compressed tile based on the determined compression process executed to obtain the compressed tile. For example, in response to the matrix compression circuitry 504 executing a "zero compression" process to obtain the compressed tile, the data decompression circuitry 914 can decompress the compressed tile based on values of bits in a bitmap (e.g., of metadata 102) and values of bytes in the compressed tile (e.g., the compressed matrix data 101).

Further, in response to the matrix compression circuitry 504 executing an "all zero" compression process to obtain the compressed tile, the data decompression circuitry 914 can load a quantity of bytes having values of zero based on the size of the uncompressed tile.

In an embodiment, the memory 916 includes metadata (e.g., the metadata 102 of FIG. 1) and one or more tiles associated therewith (e.g., including the compressed matrix data 101 of FIG. 1). For example, the data transceiver 902 can store the metadata and the tiles in the memory 916 in response to receiving the metadata and the tiles from the matrix compression circuitry 504 via the bus 901. As such, the bridging circuitry 904, the data locator circuitry 906, the data type identification circuitry 908, the data size determination circuitry 910, the decompression decision circuitry 912, and the data decompression circuitry 914 can access the metadata and the tiles stored in the memory 916 via the bus 918.

In various other embodiments, a TLDEXPAND instruction is of an instruction type which corresponds to only one predetermined matrix size and/or to only one predetermined compression type, for example. In one such embodiment, matrix decompression circuitry 900 omits data type identification circuitry 908, data size determination circuitry 910 and/or decompression decision circuitry 912—e.g., wherein the metadata which corresponds to the compressed matrix data omits an identifier of a matrix size, an identifier of whether the matrix is compressed and/or an identifier of a particular compression type.

FIG. 10 shows pseudocode 1000 illustrating operations performed by the execution of a load and expand instruction TLDEXPANDB according to one example embodiment. The instruction TLDEXPANDB represented with pseudocode 1000 illustrates one example of a TLDEXPAND instruction which is to decompress a tile comprising elements which are each one byte in size.

In the example embodiment shown, the TLDEXPANDB instruction comprises a destination operand (tdest) which is to specify or otherwise indicate a first location—e.g., in a memory or a register—where a decompressed tile is to be loaded or otherwise stored after decompression operations of pseudocode 1000. The TLDEXPANDB instruction further comprises a source operand (tsib) which is to specify or otherwise indicate a second location—e.g., in a memory or a register—from which a compressed tile, and corresponding metadata, are to be retrieved. The TLDEXPANDB instruction further comprises an immediate value operand (count) which specifies or otherwise indicates a total number of elements which are represented in the compressed tile. For example, a number of tile elements identified by the operand count is less than a total number of elements of the decompressed tile which is obtained by the execution of the TLDEXPANDB instruction.

In the example embodiment shown, operations represented by a first portion 1010 of the pseudocode 1000 are performed—for example, with bridging circuitry 904, data locator circuitry 906, and/or other suitable circuitry of matrix decompression circuitry—to determine the respective values of certain variables which are to be used in executing the TLDEXPANDB instruction. Some or all such values are determined, for example, based on the count, one or more characteristics of the compressed tile information, and/or one or more characteristics of metadata (e.g., including a compression mask bitmap) which corresponds to the compressed tile information.

In an embodiment, operations represented by a second portion 1012 of the pseudocode 1000 are performed—for example, with data transceiver 902 of matrix decompression circuitry 900—to read or otherwise identify the compressed tile information and the corresponding metadata. In an embodiment, operations represented by a third portion 1014 of the pseudocode 1000 are performed—for example, with data decompression circuitry 914 of matrix decompression circuitry 900—to determine the respective values of elements of the decompressed tile. In one such embodiment, the third portion 1014 corresponds functionally to some or all of decompression operations 800. In one such embodiment, an operation 1016 is performed—e.g., by data transceiver 902 of matrix decompression circuitry 900—to write the value of a given element of the decompressed tile to a destination location indicated by the operand tdest.

FIG. 11 shows pseudocode 1100 illustrating operations performed by the execution of a load and expand instruction TLDEXPANDW according to another example embodiment. The instruction TLDEXPANDW represented with pseudocode 1100 illustrates one example of a TLDEXPAND instruction which is to decompress a tile comprising elements which are each one word in size.

In the example embodiment shown, the TLDEXPANDW instruction operands tdest, tsib, count which (for example) correspond functionally to the operands of TLDEXPANDB which are described herein. In one such embodiment, operations represented by a first portion 1110 of the pseudocode 1100 are performed—for example, with bridging circuitry 904, data locator circuitry 906, and/or other suitable circuitry of matrix decompression circuitry—to determine the respective values of certain variables which are to be used in executing the TLDEXPANDW instruction.

Furthermore, operations represented by a second portion 1112 of the pseudocode 1100 are performed—for example, with data transceiver 902 of matrix decompression circuitry 900—to read or otherwise identify the compressed tile information and the corresponding metadata. Further still, operations represented by a third portion 1114 of the pseudocode 1100 are performed—for example, with data decompression circuitry 914 of matrix decompression circuitry 900—to determine the respective values of elements of the decompressed tile. In one such embodiment, the third portion 1114 corresponds functionally to some or all of decompression operations 800. In one such embodiment, an operation 1116 is performed—e.g., by data transceiver 902 of matrix decompression circuitry 900—to write the value of a given element of the decompressed tile to a destination location indicated by the operand tdest.

Exemplary Computer Architectures.

Detailed below are describes of exemplary computer architectures. Other system designs and configurations known in the arts for laptop, desktop, and handheld personal computers (PC)s, personal digital assistants, engineering workstations, servers, disaggregated servers, network devices, network hubs, switches, routers, embedded processors, digital signal processors (DSPs), graphics devices, video game devices, set-top boxes, micro controllers, cell phones, portable media players, hand-held devices, and various other electronic devices, are also suitable. In general, a variety of systems or electronic devices capable of incorporating a processor and/or other execution logic as disclosed herein are generally suitable.

Figure 12:
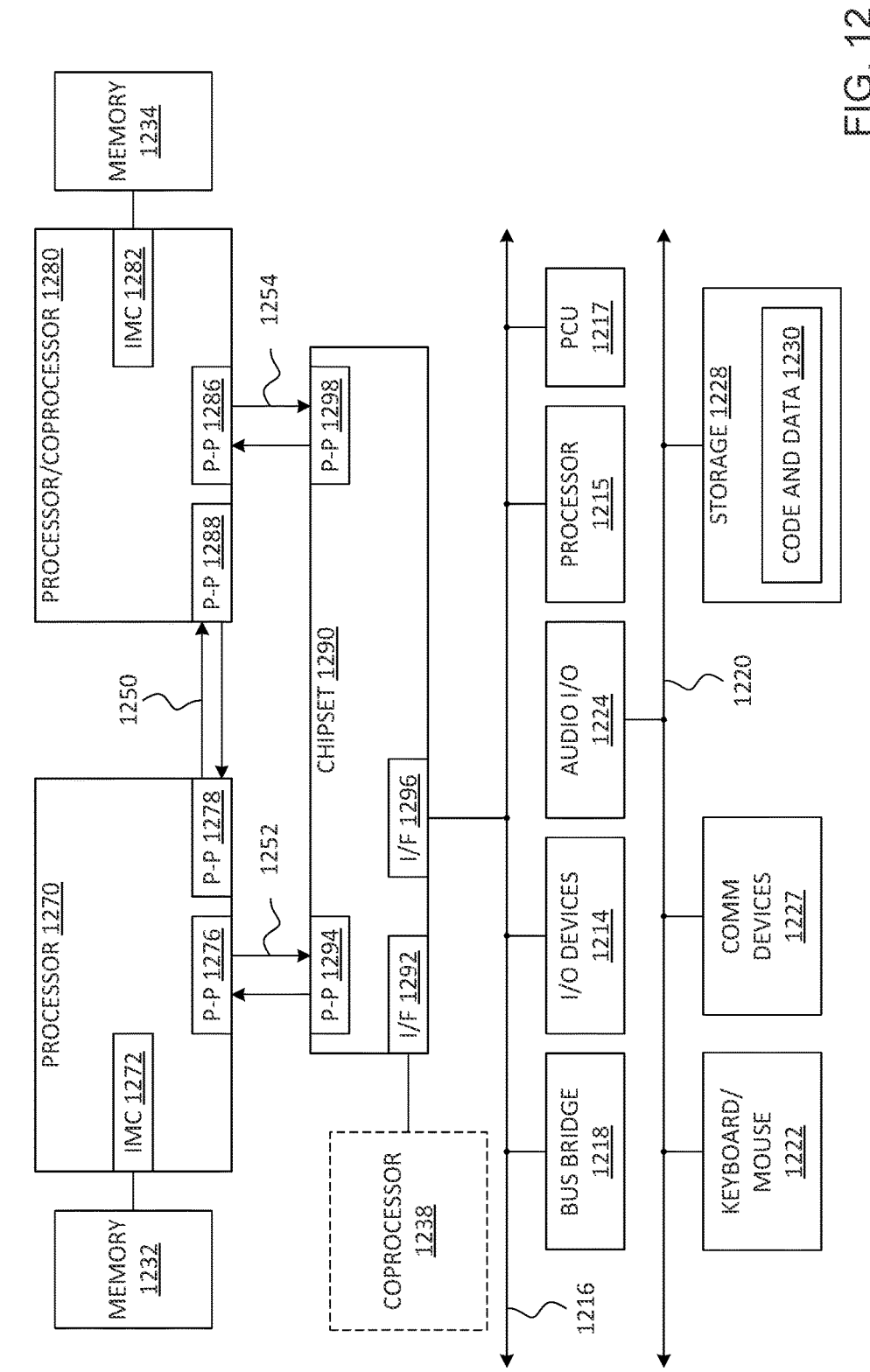
FIG. 12 illustrates an exemplary system.

FIG. 12 illustrates an exemplary system. Multiprocessor system 1200 is a point-to-point interconnect system and includes a plurality of processors including a first processor 1270 and a second processor 1280 coupled via a point-to-point interconnect 1250. In some examples, the first processor 1270 and the second processor 1280 are homogeneous. In some examples, first processor 1270 and the second processor 1280 are heterogenous. Though the exemplary system 1200 is shown to have two processors, the system may have three or more processors, or may be a single processor system.

Processors 1270 and 1280 are shown including integrated memory controller (IMC) circuitry 1272 and 1282, respectively. Processor 1270 also includes as part of its interconnect controller point-to-point (P-P) interfaces 1276 and 1278; similarly, second processor 1280 includes P-P interfaces 1286 and 1288. Processors 1270, 1280 may exchange information via the point-to-point (P-P) interconnect 1250 using P-P interface circuits 1278, 1288. IMCs 1272 and 1282 couple the processors 1270, 1280 to respective memories, namely a memory 1232 and a memory 1234, which may be portions of main memory locally attached to the respective processors.

Processors 1270, 1280 may each exchange information with a chipset 1290 via individual P-P interconnects 1252, 1254 using point to point interface circuits 1276, 1294, 1286, 1298. Chipset 1290 may optionally exchange information with a coprocessor 1238 via an interface 1292. In some examples, the coprocessor 1238 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 1270, 1280 or outside of both processors, yet connected with the processors via P-P interconnect, such that either or both processors' local cache information may be stored in the shared cache if a processor is placed into a low power mode.

Chipset 1290 may be coupled to a first interconnect 1216 via an interface 1296. In some examples, first interconnect 1216 may be a Peripheral Component Interconnect (PCI) interconnect, or an interconnect such as a PCI Express interconnect or another 110 interconnect. In some examples, one of the interconnects couples to a power control unit (PCU) 1217, which may include circuitry, software, and/or firmware to perform power management operations with regard to the processors 1270, 1280 and/or co-processor 1238. PCU 1217 provides control information to a voltage regulator (not shown) to cause the voltage regulator to generate the appropriate regulated voltage. PCU 1217 also provides control information to control the operating voltage generated. In various examples, PCU 1217 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 1217 is illustrated as being present as logic separate from the processor 1270 and/or processor 1280. In other cases, PCU 1217 may execute on a given one or more of cores (not shown) of processor 1270 or 1280. In some cases, PCU 1217 may be implemented as a microcontroller (dedicated or general-purpose) or other control logic configured to execute its own dedicated power management code, sometimes referred to as P-code. In yet other examples, power management operations to be performed by PCU 1217 may be implemented externally to a processor, such as by way of a separate power management integrated circuit (PMIC) or another component external to the processor. In yet other examples, power management operations to be performed by PCU 1217 may be implemented within BIOS or other system software.

Various I/O devices 1214 may be coupled to first interconnect 1216, along with a bus bridge 1218 which couples first interconnect 1216 to a second interconnect 1220. In some examples, one or more additional processor(s) 1215, such as coprocessors, high-throughput many integrated core (MIC) processors, GPGPUs, accelerators (such as graphics accelerators or digital signal processing (DSP) units), field programmable gate arrays (FPGAs), or any other processor, are coupled to first interconnect 1216. In some examples, second interconnect 1220 may be a low pin count (LPC) interconnect. Various devices may be coupled to second interconnect 1220 including, for example, a keyboard and/or mouse 1222, communication devices 1227 and a storage circuitry 1228. Storage circuitry 1228 may be one or more non-transitory machine-readable storage media as described below, such as a disk drive or other mass storage device which may include instructions/code and data 1230 and may implement the storage 203 in some examples. Further, an audio I/O 1224 may be coupled to second interconnect 1220. Note that other architectures than the point-to-point architecture described above are possible. For example, instead of the point-to-point architecture, a system such as multiprocessor system 1200 may implement a multi-drop interconnect or other such architecture.

Exemplary Core Architectures, Processors, and Computer Architectures.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may include on the same die as the described CPU (sometimes referred to as the application core(s) or application processor(s)), the above described coprocessor, and additional functionality. Exemplary core architectures are described next, followed by descriptions of exemplary processors and computer architectures.

FIG. 13 illustrates a block diagram of an example processor 1300 that may have more than one core and an integrated memory controller. The solid lined boxes illustrate a processor 1300 with a single core 1302A, a system agent unit circuitry 1310, a set of one or more interconnect controller unit(s) circuitry 1316, while the optional addition of the dashed lined boxes illustrates an alternative processor 1300 with multiple cores 1302A-N, a set of one or more integrated memory controller unit(s) circuitry 1314 in the system agent unit circuitry 1310, and special purpose logic 1308, as well as a set of one or more interconnect controller units circuitry 1316. Note that the processor 1300 may be one of the processors 1270 or 1280, or co-processor 1238 or 1215 of FIG. 12.

Thus, different implementations of the processor 1300 may include: 1) a CPU with the special purpose logic 1308 being integrated graphics and/or scientific (throughput) logic (which may include one or more cores, not shown), and the cores 1302A-N being one or more general purpose cores (e.g., general purpose in-order cores, general purpose out-of-order cores, or a combination of the two); 2) a coprocessor with the cores 1302A-N being a large number of special purpose cores intended primarily for graphics and/or scientific (throughput); and 3) a coprocessor with the cores 1302A-N being a large number of general purpose in-order cores. Thus, the processor 1300 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 1300 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 1304A-N within the cores 1302A-N, a set of one or more shared cache unit(s) circuitry 1306, and external memory (not shown) coupled to the set of integrated memory controller unit(s) circuitry 1314. The set of one or more shared cache unit(s) circuitry 1306 may include one or more mid-level caches, such as level 2 (L2), level 3 (L3), level 4 (L4), or other levels of cache, such as a last level cache (LLC), and/or combinations thereof. While in some examples ring-based interconnect network circuitry 1312 interconnects the special purpose logic 1308 (e.g., integrated graphics logic), the set of shared cache unit(s) circuitry 1306, and the system agent unit circuitry 1310, alternative examples use any number of well-known techniques for interconnecting such units. In some examples, coherency is maintained between one or more of the shared cache unit(s) circuitry 1306 and cores 1302A-N.

In some examples, one or more of the cores 1302A-N are capable of multi-threading. The system agent unit circuitry 1310 includes those components coordinating and operating cores 1302A-N. The system agent unit circuitry 1310 may include, for example, power control unit (PCU) circuitry and/or display unit circuitry (not shown). The PCU may be or may include logic and components needed for regulating the power state of the cores 1302A-N and/or the special purpose logic 1308 (e.g., integrated graphics logic). The display unit circuitry is for driving one or more externally connected displays.

The cores 1302A-N may be homogenous in terms of instruction set architecture (ISA). Alternatively, the cores 1302A-N may be heterogeneous in terms of ISA; that is, a subset of the cores 1302A-N may be capable of executing an ISA, while other cores may be capable of executing only a subset of that ISA or another ISA.

Exemplary Core Architectures-In-order and Out-of-Order Core Block Diagram.

FIG. 14A is a block diagram illustrating both an exemplary in-order pipeline and an exemplary register renaming, out-of-order issue/execution pipeline according to examples. FIG. 14B is a block diagram illustrating both an exemplary example of an in-order architecture core and an exemplary register renaming, out-of-order issue/execution architecture core to be included in a processor according to examples. The solid lined boxes in FIGS. 14A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 14A, a processor pipeline 1400 includes a fetch stage 1402, an optional length decoding stage 1404, a decode stage 1406, an optional allocation (Alloc) stage 1408, an optional renaming stage 1410, a schedule (also known as a dispatch or issue) stage 1412, an optional register read/memory read stage 1414, an execute stage 1416, a write back/memory write stage 1418, an optional exception handling stage 1422, and an optional commit stage 1424. One or more operations can be performed in each of these processor pipeline stages. For example, during the fetch stage 1402, one or more instructions are fetched from instruction memory, and during the decode stage 1406, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 1406 and the register read/memory read stage 1414 may be combined into one pipeline stage. In one example, during the execute stage 1416, the decoded instructions may be executed, LSU address/data pipelining to an Advanced Microcontroller Bus (AMB) interface may be performed, multiply and add operations may be performed, arithmetic operations with branch results may be performed, etc.

By way of example, the exemplary register renaming, out-of-order issue/execution architecture core of FIG. 14B may implement the pipeline 1400 as follows: 1) the instruction fetch circuitry 1438 performs the fetch and length decoding stages 1402 and 1404; 2) the decode circuitry 1440 performs the decode stage 1406; 3) the rename/allocator unit circuitry 1452 performs the allocation stage 1408 and renaming stage 1410; 4) the scheduler(s) circuitry 1456 performs the schedule stage 1412; 5) the physical register file(s) circuitry 1458 and the memory unit circuitry 1470 perform the register read/memory read stage 1414; the execution cluster(s) 1460 perform the execute stage 1416; 6) the memory unit circuitry 1470 and the physical register file(s) circuitry 1458 perform the write back/memory write stage 1418; 7) various circuitry may be involved in the exception handling stage 1422; and 8) the retirement unit circuitry 1454 and the physical register file(s) circuitry 1458 perform the commit stage 1424.

FIG. 14B shows a processor core 1490 including front-end unit circuitry 1430 coupled to an execution engine unit circuitry 1450, and both are coupled to a memory unit circuitry 1470. The core 1490 may be a reduced instruction set architecture computing (RISC) core, a complex instruction set architecture computing (CISC) core, a very long instruction word (VLIW) core, or a hybrid or alternative core type. As yet another option, the core 1490 may be a special-purpose core, such as, for example, a network or communication core, compression engine, coprocessor core, general purpose computing graphics processing unit (GPGPU) core, graphics core, or the like.

The front end unit circuitry 1430 may include branch prediction circuitry 1432 coupled to an instruction cache circuitry 1434, which is coupled to an instruction translation lookaside buffer (TLB) 1436, which is coupled to instruction fetch circuitry 1438, which is coupled to decode circuitry 1440. In one example, the instruction cache circuitry 1434 is included in the memory unit circuitry 1470 rather than the front-end circuitry 1430. The decode circuitry 1440 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 1440 may further include an address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 1440 may be implemented using various different mechanisms. Examples of suitable mechanisms include, but are not limited to, look-up tables, hardware implementations, programmable logic arrays (PLAs), microcode read only memories (ROMs), etc. In one example, the core 1490 includes a microcode ROM (not shown) or other medium that stores microcode for certain macroinstructions (e.g., in decode circuitry 1440 or otherwise within the front end circuitry 1430). In one example, the decode circuitry 1440 includes a micro-operation (micro-op) or operation cache (not shown) to hold/cache decoded operations, micro-tags, or micro-operations generated during the decode or other stages of the processor pipeline 1400. The decode circuitry 1440 may be coupled to rename/allocator unit circuitry 1452 in the execution engine circuitry 1450.

The execution engine circuitry 1450 includes the rename/allocator unit circuitry 1452 coupled to a retirement unit circuitry 1454 and a set of one or more scheduler(s) circuitry 1456. The scheduler(s) circuitry 1456 represents any number of different schedulers, including reservations stations, central instruction window, etc. In some examples, the scheduler(s) circuitry 1456 can include arithmetic logic unit (ALU) scheduler/scheduling circuitry, ALU queues, arithmetic generation unit (AGU) scheduler/scheduling circuitry, AGU queues, etc. The scheduler(s) circuitry 1456 is coupled to the physical register file(s) circuitry 1458. Each of the physical register file(s) circuitry 1458 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 1458 includes vector registers unit circuitry, write-mask registers unit circuitry, and scalar register unit circuitry. These register units may provide architectural vector registers, vector mask registers, general-purpose registers, etc. The physical register file(s) circuitry 1458 is coupled to the retirement unit circuitry 1454 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1454 and the physical register file(s) circuitry 1458 are coupled to the execution cluster(s) 1460. The execution cluster(s) 1460 includes a set of one or more execution unit(s) circuitry 1462 and a set of one or more memory access circuitry 1464. The execution unit(s) circuitry 1462 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 1456, physical register file(s) circuitry 1458, and execution cluster(s) 1460 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 1464). It should also be understood that where separate pipelines are used, one or more of these pipelines may be out-of-order issue/execution and the rest in-order.

In some examples, the execution engine unit circuitry 1450 may perform load store unit (LSU) address/data pipelining to an Advanced Microcontroller Bus (AMB) interface (not shown), and address phase and writeback, data phase load, store, and branches.

The set of memory access circuitry 1464 is coupled to the memory unit circuitry 1470, which includes data TLB circuitry 1472 coupled to a data cache circuitry 1474 coupled to a level 2 (L2) cache circuitry 1476. In one exemplary example, the memory access circuitry 1464 may include a load unit circuitry, a store address unit circuit, and a store data unit circuitry, each of which is coupled to the data TLB circuitry 1472 in the memory unit circuitry 1470. The instruction cache circuitry 1434 is further coupled to the level 2 (L2) cache circuitry 1476 in the memory unit circuitry 1470. In one example, the instruction cache 1434 and the data cache 1474 are combined into a single instruction and data cache (not shown) in L2 cache circuitry 1476, a level 3 (L3) cache circuitry (not shown), and/or main memory. The L2 cache circuitry 1476 is coupled to one or more other levels of cache and eventually to a main memory.

The core 1490 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, the core 1490 includes logic to support a packed data instruction set architecture extension (e.g., AVX1, AVX2), thereby allowing the operations used by many multimedia applications to be performed using packed data.

Exemplary Execution Unit(s) Circuitry.

Figure 15:
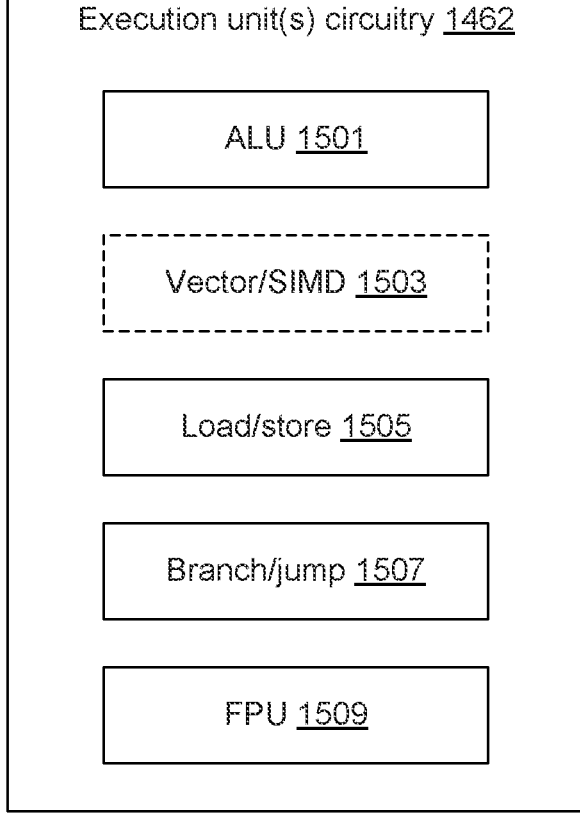
FIG. 15 illustrates examples of execution unit(s) circuitry.

FIG. 15 illustrates examples of execution unit(s) circuitry, such as execution unit(s) circuitry 1462 of FIG. 14B. As illustrated, execution unit(s) circuity 1462 may include one or more ALU circuits 1501, optional vector/single instruction multiple data (SIMD) circuits 1503, load/store circuits 1505, branch/jump circuits 1507, and/or Floating-point unit (FPU) circuits 1509. ALU circuits 1501 perform integer arithmetic and/or Boolean operations. Vector/SIMD circuits 1503 perform vector/SIMD operations on packed data (such as SIMD/vector registers). Load/store circuits 1505 execute load and store instructions to load data from memory into registers or store from registers to memory. Load/store circuits 1505 may also generate addresses. Branch/jump circuits 1507 cause a branch or jump to a memory address depending on the instruction. FPU circuits 1509 perform floating-point arithmetic. The width of the execution unit(s) circuitry 1462 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Exemplary Register Architecture

Figures 16, 17:
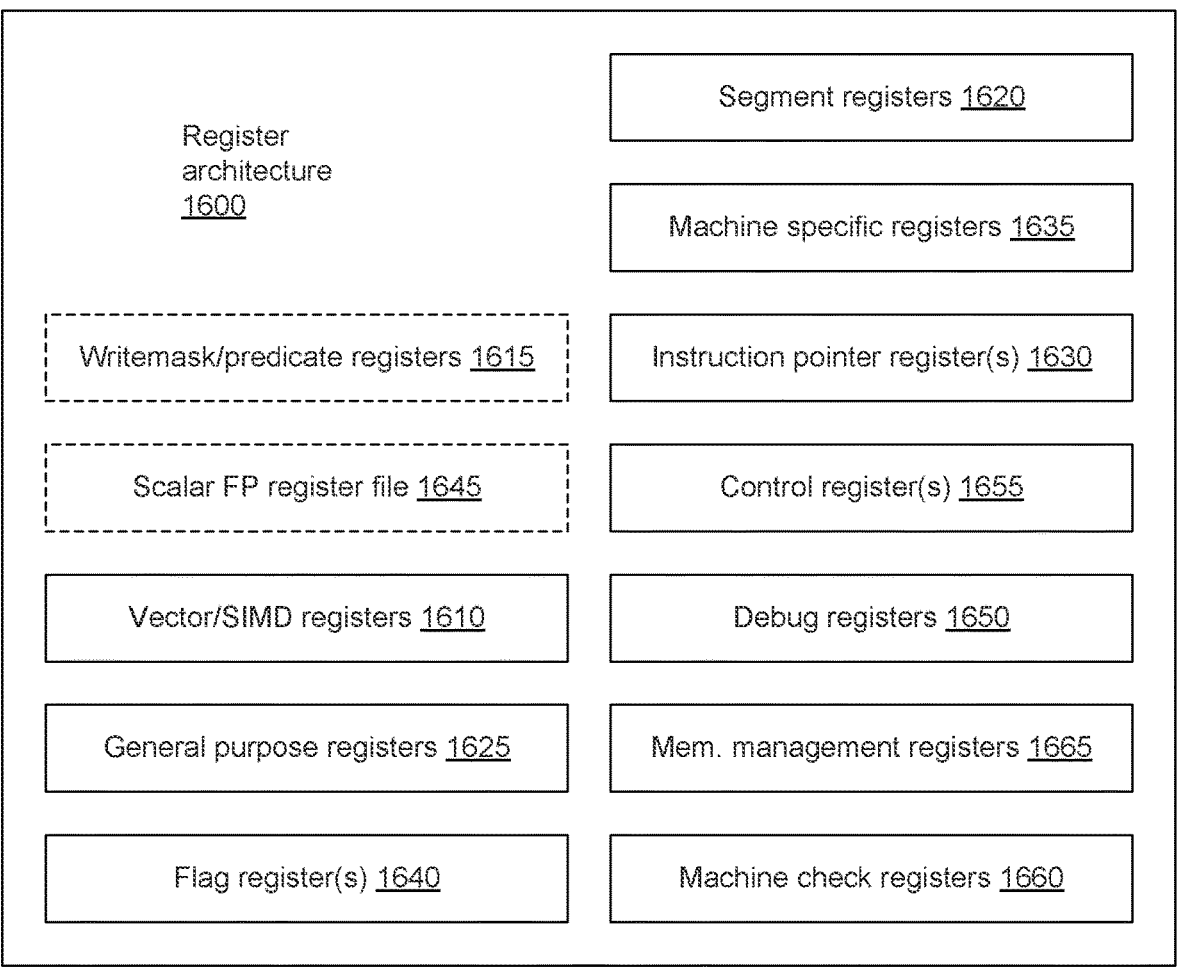
FIG. 16 is a block diagram of a register architecture according to some examples.
FIG. 17 illustrates examples of an instruction format.

FIG. 16 is a block diagram of a register architecture 1600 according to some examples. As illustrated, the register architecture 1600 includes vector/SIMD registers 1610 that vary from 128-bit to 1,024 bits width. In some examples, the vector/SIMD registers 1610 are physically 512-bits and, depending upon the mapping, only some of the lower bits are used. For example, in some examples, the vector/SIMD registers 1610 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 1600 includes writemask/predicate registers 1615. For example, in some examples, there are 8 writemask/predicate registers (sometimes called k0 through k7) that are each 16-bit, 32-bit, 64-bit, or 128-bit in size. Writemask/predicate registers 1615 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 1615 corresponds to a data element position of the destination. In other examples, the writemask/predicate registers 1615 are scalable and consists of a set number of enable bits for a given vector element (e.g., 8 enable bits per 64-bit vector element).

The register architecture 1600 includes a plurality of general-purpose registers 1625. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 1600 includes scalar floating-point (FP) register 1645 which is used for scalar floating-point operations on 32/64/80-bit floating-point data using the x87 instruction set architecture extension or as MMX registers to perform operations on 64-bit packed integer data, as well as to hold operands for some operations performed between the MMX and XMM registers.

One or more flag registers 1640 (e.g., EFLAGS, RFLAGS, etc.) store status and control information for arithmetic, compare, and system operations. For example, the one or more flag registers 1640 may store condition code information such as carry, parity, auxiliary carry, zero, sign, and overflow. In some examples, the one or more flag registers 1640 are called program status and control registers.

Segment registers 1620 contain segment points for use in accessing memory. In some examples, these registers are referenced by the names CS, DS, SS, ES, FS, and GS.

Machine specific registers (MSRs) 1635 control and report on processor performance. Most MSRs 1635 handle system-related functions and are not accessible to an application program. Machine check registers 1660 consist of control, status, and error reporting MSRs that are used to detect and report on hardware errors.

One or more instruction pointer register(s) 1630 store an instruction pointer value. Control register(s) 1655 (e.g., CR0-CR4) determine the operating mode of a processor (e.g., processor 1270, 1280, 1238, 1215, and/or 1300) and the characteristics of a currently executing task. Debug registers 1650 control and allow for the monitoring of a processor or core's debugging operations.

Memory (mem) management registers 1665 specify the locations of data structures used in protected mode memory management. These registers may include a GDTR, IDRT, task register, and a LDTR register.

Alternative examples may use wider or narrower registers. Additionally, alternative examples may use more, less, or different register files and registers. The register architecture 1600 may, for example, be used in register file/memory 208, or physical register file(s) circuitry 1458.

Instruction Set Architectures.

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down through the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. In addition, though the description below is made in the context of x86 ISA, it is within the knowledge of one skilled in the art to apply the teachings of the present disclosure in another ISA.

Exemplary Instruction Formats.

Examples of the instruction(s) described herein may be embodied in different formats. Additionally, exemplary systems, architectures, and pipelines are detailed below. Examples of the instruction(s) may be executed on such systems, architectures, and pipelines, but are not limited to those detailed.

FIG. 17 illustrates examples of an instruction format. As illustrated, an instruction may include multiple components including, but not limited to, one or more fields for: one or more prefixes 1701, an opcode 1703, addressing information 1705 (e.g., register identifiers, memory addressing information, etc.), a displacement value 1707, and/or an immediate value 1709. Note that some instructions utilize some or all of the fields of the format whereas others may only use the field for the opcode 1703. In some examples, the order illustrated is the order in which these fields are to be encoded, however, it should be appreciated that in other examples these fields may be encoded in a different order, combined, etc.

The prefix(es) field(s) 1701, when used, modifies an instruction. In some examples, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 1703 is used to at least partially define the operation to be performed upon a decoding of the instruction. In some examples, a primary opcode encoded in the opcode field 1703 is one, two, or three bytes in length. In other examples, a primary opcode can be a different length. An additional 3-bit opcode field is sometimes encoded in another field.

Figure 18:
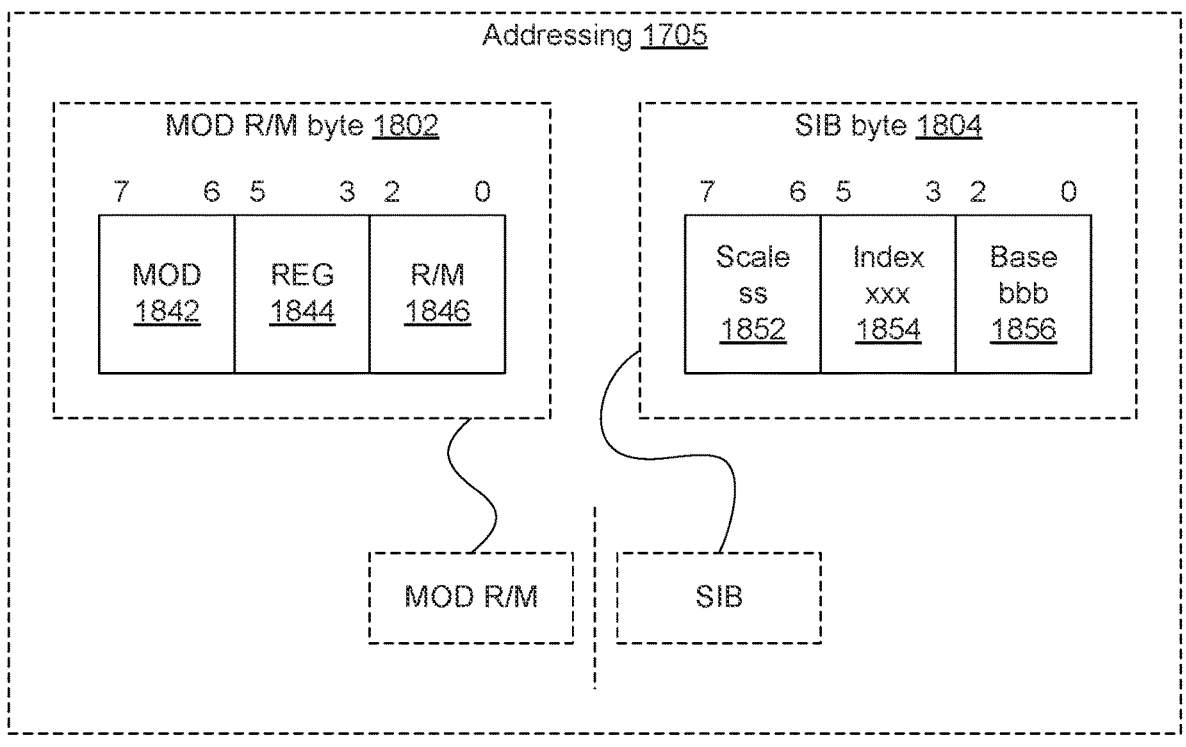
FIG. 18 illustrates examples of an addressing field.

The addressing field 1705 is used to address one or more operands of the instruction, such as a location in memory or one or more registers. FIG. 18 illustrates examples of the addressing field 1705. In this illustration, an optional ModR/M byte 1802 and an optional Scale, Index, Base (SIB) byte 1804 are shown. The ModR/M byte 1802 and the SIB byte 1804 are used to encode up to two operands of an instruction, each of which is a direct register or effective memory address. Note that each of these fields are optional in that not all instructions include one or more of these fields. The MOD R/M byte 1802 includes a MOD field 1842, a register (reg) field 1844, and R/M field 1846.

The content of the MOD field 1842 distinguishes between memory access and non-memory access modes. In some examples, when the MOD field 1842 has a binary value of 11 (11b), a register-direct addressing mode is utilized, and otherwise register-indirect addressing is used.

The register field 1844 may encode either the destination register operand or a source register operand, or may encode an opcode extension and not be used to encode any instruction operand. The content of register index field 1844, directly or through address generation, specifies the locations of a source or destination operand (either in a register or in memory). In some examples, the register field 1844 is supplemented with an additional bit from a prefix (e.g., prefix 1701) to allow for greater addressing.

The R/M field 1846 may be used to encode an instruction operand that references a memory address or may be used to encode either the destination register operand or a source register operand. Note the R/M field 1846 may be combined with the MOD field 1842 to dictate an addressing mode in some examples.

The SIB byte 1804 includes a scale field 1852, an index field 1854, and a base field 1856 to be used in the generation of an address. The scale field 1852 indicates scaling factor. The index field 1854 specifies an index register to use. In some examples, the index field 1854 is supplemented with an additional bit from a prefix (e.g., prefix 1701) to allow for greater addressing. The base field 1856 specifies a base register to use. In some examples, the base field 1856 is supplemented with an additional bit from a prefix (e.g., prefix 1701) to allow for greater addressing. In practice, the content of the scale field 1852 allows for the scaling of the content of the index field 1854 for memory address generation (e.g., for address generation that uses 2scale*index+base).

Some addressing forms utilize a displacement value to generate a memory address. For example, a memory address may be generated according to 2scale*index+base+displacement, index*scale+displacement, r/m+displacement, instruction pointer (RIP/EIP)+displacement, register+displacement, etc. The displacement may be a 1-byte, 2-byte, 4-byte, etc. value. In some examples, a displacement 1707 provides this value. Additionally, in some examples, a displacement factor usage is encoded in the MOD field of the addressing field 1705 that indicates a compressed displacement scheme for which a displacement value is calculated and stored in the displacement field 1707.

In some examples, an immediate field 1709 specifies an immediate value for the instruction. An immediate value may be encoded as a 1-byte value, a 2-byte value, a 4-byte value, etc.

FIG. 19 illustrates examples of a first prefix 1701(A). In some examples, the first prefix 1701(A) is an example of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 1701(A) may specify up to three registers using 3-bit fields depending on the format: 1) using the reg field 1844 and the R/M field 1846 of the Mod R/M byte 1802; 2) using the Mod R/M byte 1802 with the SIB byte 1804 including using the reg field 1844 and the base field 1856 and index field 1854; or 3) using the register field of an opcode.

In the first prefix 1701(A), bit positions 7:4 are set as 0100. Bit position 3 (W) can be used to determine the operand size but may not solely determine operand width. As such, when W=0, the operand size is determined by a code segment descriptor (CS.D) and when W=1, the operand size is 64-bit.

Note that the addition of another bit allows for 16 (24) registers to be addressed, whereas the MOD R/M reg field 1844 and MOD R/M R/M field 1846 alone can each only address 8 registers.

In the first prefix 1701(A), bit position 2 (R) may be an extension of the MOD R/M reg field 1844 and may be used to modify the ModR/M reg field 1844 when that field encodes a general-purpose register, a 64-bit packed data register (e.g., a SSE register), or a control or debug register. R is ignored when Mod R/M byte 1802 specifies other registers or defines an extended opcode.

Bit position 1 (X) may modify the SIB byte index field 1854.

Bit position 0 (B) may modify the base in the Mod R/M R/M field 1846 or the SIB byte base field 1856; or it may modify the opcode register field used for accessing general purpose registers (e.g., general purpose registers 1625).

FIGS. 20A-D illustrate examples of how the R, X, and B fields of the first prefix 1701(A) are used. FIG. 20A illustrates R and B from the first prefix 1701(A) being used to extend the reg field 1844 and R/M field 1846 of the MOD R/M byte 1802 when the SIB byte 18 04 is not used for memory addressing. FIG. 20B illustrates R and B from the first prefix 1701(A) being used to extend the reg field 1844 and R/M field 1846 of the MOD R/M byte 1802 when the SIB byte 1804 is not used (register-register addressing). FIG. 20C illustrates R, X, and B from the first prefix 1701(A) being used to extend the reg field 1844 of the MOD R/M byte 1802 and the index field 1854 and base field 1856 when the SIB byte 18 04 being used for memory addressing. FIG. 20D illustrates B from the first prefix 1701(A) being used to extend the reg field 1844 of the MOD R/M byte 1802 when a register is encoded in the opcode 1703.

Figure 21A:
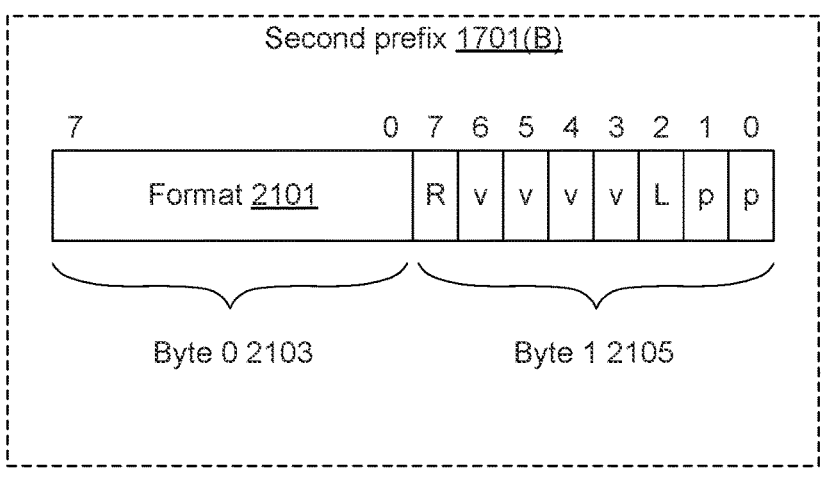
FIGS. 21A-B illustrate examples of a second prefix.
Figure 21B:
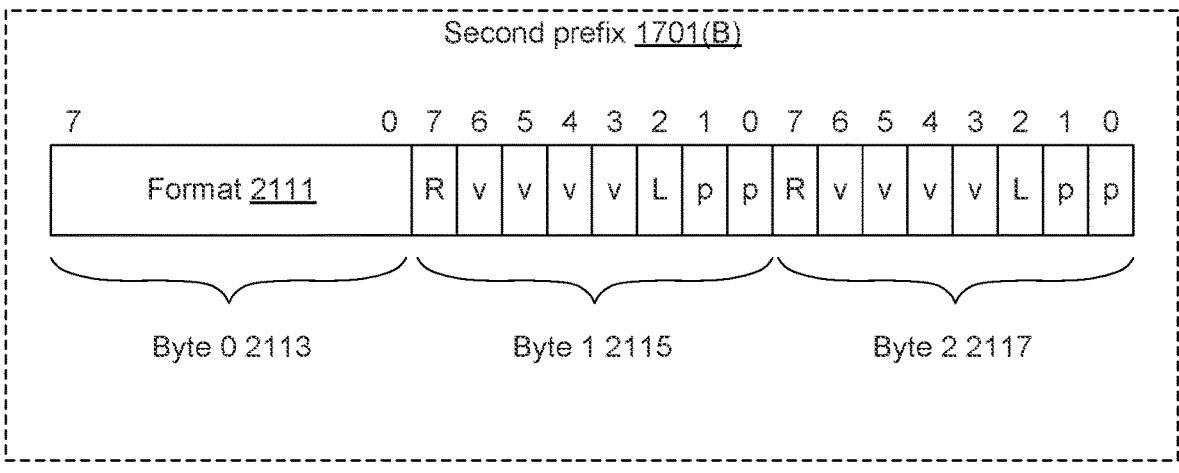

FIGS. 21A-B illustrate examples of a second prefix 1701 (B). In some examples, the second prefix 1701(B) is an example of a VEX prefix. The second prefix 1701(B) encoding allows instructions to have more than two operands, and allows SIMD vector registers (e.g., vector/SIMD registers 1610) to be longer than 64-bits (e.g., 128-bit and 256-bit). The use of the second prefix 1701(B) provides for three-operand (or more) syntax. For example, previous two-operand instructions performed operations such as A=A+B, which overwrites a source operand. The use of the second prefix 1701(B) enables operands to perform nondestructive operations such as A=B+C.

In some examples, the second prefix 1701(B) comes in two forms—a two-byte form and a three-byte form. The two-byte second prefix 1701(B) is used mainly for 128-bit, scalar, and some 256-bit instructions; while the three-byte second prefix 1701(B) provides a compact replacement of the first prefix 1701(A) and 3-byte opcode instructions.

FIG. 21A illustrates examples of a two-byte form of the second prefix 1701(B). In one example, a format field 2101 (byte 0 2103) contains the value C5H. In one example, byte 1 2105 includes a "R" value in bit[7]. This value is the complement of the "R" value of the first prefix 1701(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 0 =no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 1846 to encode the instruction operand that references a memory address or encode either the destination register operand or a source register operand.

Instructions that use this prefix may use the Mod R/M reg field 1844 to encode either the destination register operand or a source register operand, be treated as an opcode extension and not used to encode any instruction operand.

For instruction syntax that support four operands, vvvv, the Mod R/M R/M field 1846 and the Mod R/M reg field 1844 encode three of the four operands. Bits[7:4] of the immediate 1709 are then used to encode the third source register operand.

FIG. 21B illustrates examples of a three-byte form of the second prefix 1701(B). In one example, a format field 2111 (byte 0 2113) contains the value C4H. Byte 1 2115 includes in bits[7:5] "R," "X," and "B" which are the complements of the same values of the first prefix 1701(A). Bits[4:0] of byte 1 2115 (shown as mmmmm) include content to encode, as need, one or more implied leading opcode bytes. For example, 00001 implies a OFH leading opcode, 00010 implies a 0F38H leading opcode, 00011 implies a leading OF3AH opcode, etc.

Bit[7] of byte 2 2117 is used similar to W of the first prefix 1701(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in is complement form for certain vector shifts; or 3) not encode any operand, the field is reserved and should contain a certain value, such as 1111b.

Instructions that use this prefix may use the Mod R/M R/M field 1846 to encode the instruction operand that references a memory address or encode either the destination register operand or a source register operand.

Instructions that use this prefix may use the Mod R/M reg field 1844 to encode either the destination register operand or a source register operand, be treated as an opcode extension and not used to encode any instruction operand.

For instruction syntax that support four operands, vvvv, the Mod R/M R/M field 1846, and the Mod R/M reg field 1844 encode three of the four operands. Bits[7:4] of the immediate 1709 are then used to encode the third source register operand.

Figure 22:
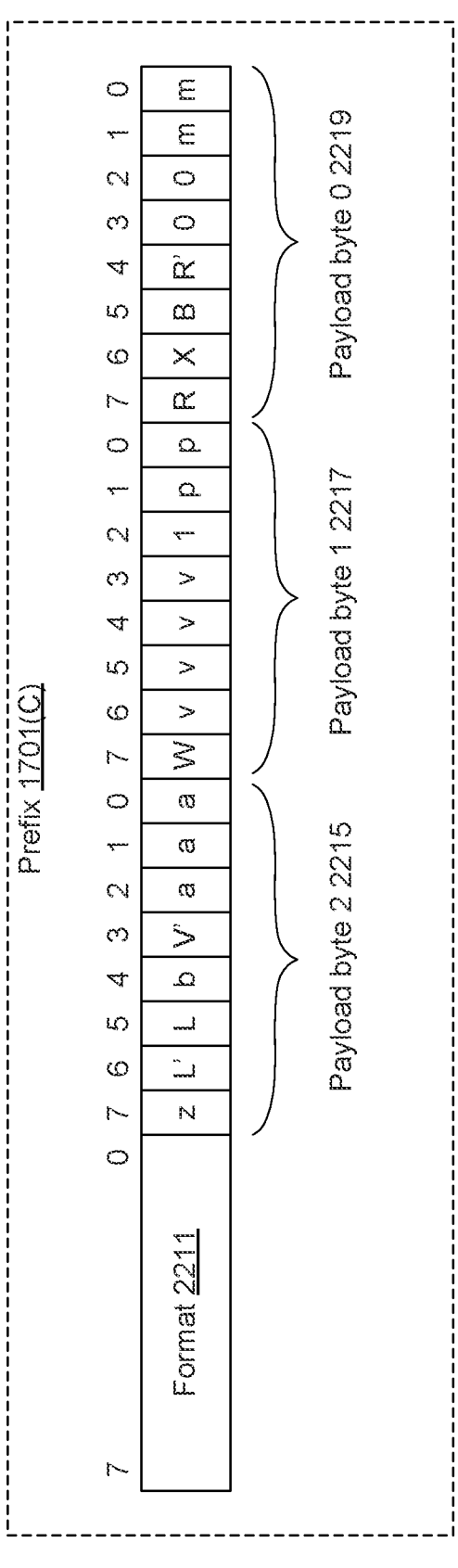
FIG. 22 illustrates examples of a third prefix.

FIG. 22 illustrates examples of a third prefix 1701(C). In some examples, the first prefix 1701(A) is an example of an EVEX prefix. The third prefix 1701(C) is a four-byte prefix.

The third prefix 1701(C) can encode 32 vector registers (e.g., 128-bit, 256-bit, and 512-bit registers) in 64-bit mode. In some examples, instructions that utilize a writemask/opmask (see discussion of registers in a previous figure, such as FIG. 16) or predication utilize this prefix. Opmask register allow for conditional processing or selection control. Opmask instructions, whose source/destination operands are opmask registers and treat the content of an opmask register as a single value, are encoded using the second prefix 1701(B).

The third prefix 1701(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 1701(C) is a format field 2211 that has a value, in one example, of 62H. Subsequent bytes are referred to as payload bytes 2215-2219 and collectively form a 24-bit value of P[23:0] providing specific capability in the form of one or more fields (detailed herein).

In some examples, P[1:0] of payload byte 2219 are identical to the low two mmmmm bits. P[3:2] are reserved in some examples. Bit P[4] (R') allows access to the high 16 vector register set when combined with P[7] and the ModR/M reg field 1844. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 1844 and ModR/M R/M field 1846. P[9:8] provide opcode extensionality equivalent to some legacy prefixes (e.g., 00=no prefix, 01=66H, 10=F3H, and 11=F2H). P[10] in some examples is a fixed value of 1. P[14:11], shown as vvvv, may be used to: 1) encode the first source register operand, specified in inverted (1s complement) form and valid for instructions with 2 or more source operands; 2) encode the destination register operand, specified in is complement form for certain vector shifts; or 3) not encode any operand, the field is reserved and should contain a certain value, such as 1111b.

P[15] is similar to W of the first prefix 1701(A) and second prefix 1701(B) and may serve as an opcode extension bit or operand size promotion.

P[18:16] specify the index of a register in the opmask (writemask) registers (e.g., writemask/predicate registers 1615). In one example, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one example, preserving the old value of each element of the destination where the corresponding mask bit has a 0. In contrast, when zeroing vector masks allow any set of elements in the destination to be zeroed during the execution of any operation (specified by the base operation and the augmentation operation); in one example, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While examples are described in which the opmask field's content selects one of a number of opmask registers that contains the opmask to be used (and thus the opmask field's content indirectly identifies that masking to be performed), alternative examples instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Exemplary examples of encoding of registers in instructions using the third prefix 1701(C) are detailed in the following tables.

TABLE 1

| 32-Register Support in 64-bit Mode | | | | | |
|---|---|---|---|---|---|
| | 4 | 3 | [2:0] | REG. TYPE | COMMON USAGES |
| REG | R' | R | ModR/M reg | GPR, Vector | Destination or Source |
| VVVV | V' | | vvvv | GPR, Vector | 2nd Source or Destination |
| RM | X | B | ModR/M R/M | GPR, Vector | 1st Source or Destination |
| BASE | 0 | B | ModR/M R/M | GPR | Memory addressing |
| INDEX | 0 | X | SIB.index | GPR | Memory addressing |
| VIDX | V' | X | SIB.index | Vector | VSIB memory addressing |

TABLE 2

| Encoding Register Specifiers in 32-bit Mode | | | |
|---|---|---|---|
| | [2:0] | REG. TYPE | COMMON USAGES |
| REG | ModR/M reg | GPR, Vector | Destination or Source |
| VVVV | vvvv | GPR, Vector | 2nd Source or Destination |
| RM | ModR/M R/M | GPR, Vector | 1st Source or Destination |
| BASE | ModR/M R/M | GPR | Memory addressing |
| INDEX | SIB.index | GPR | Memory addressing |
| VIDX | SIB.index | Vector | VSIB memory addressing |

TABLE 3

| Opmask Register Specifier Encoding | | | |
| --- | --- | --- | --- |
| | [2:0] | REG. TYPE | COMMON USAGES |
| REG | ModR/M Reg | k0-k7 | Source |
| VVVV | vvvv | k0-k7 | 2nd Source |
| RM | ModR/M R/M | k0-k7 | 1st Source |
| {k1} | aaa | k0-k7 | Opmask |

Program code may be applied to input information to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), a field programmable gate array (FPGA), a microprocessor, or any combination thereof.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Examples of the mechanisms disclosed herein may be implemented in hardware, software, firmware, or a combination of such implementation approaches. Examples may be implemented as computer programs or program code executing on programmable systems comprising at least one processor, a storage system (including volatile and non-volatile memory and/or storage elements), at least one input device, and at least one output device.

One or more aspects of at least one example may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples also include non-transitory, tangible machine-readable media containing instructions or containing design data, such as Hardware Description Language (HDL), which defines structures, circuits, apparatuses, processors and/or system features described herein. Such examples may also be referred to as program products.

Emulation (including binary translation, code morphing, etc.).

In some cases, an instruction converter may be used to convert an instruction from a source instruction set architecture to a target instruction set architecture. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 23 illustrates a block diagram contrasting the use of a software instruction converter to convert binary instructions in a source instruction set architecture to binary instructions in a target instruction set architecture according to examples. In the illustrated example, the instruction converter is a software instruction converter, although alternatively the instruction converter may be implemented in software, firmware, hardware, or various combinations thereof. FIG. 23 shows a program in a high-level language 2302 may be compiled using a first ISA compiler 2304 to generate first ISA binary code 2306 that may be natively executed by a processor with at least one first instruction set architecture core 2316. The processor with at least one first ISA instruction set architecture core 2316 represents any processor that can perform substantially the same functions as an Intel® processor with at least one first ISA instruction set architecture core by compatibly executing or otherwise processing (1) a substantial portion of the instruction set architecture of the first ISA instruction set architecture core or (2) object code versions of applications or other software targeted to run on an Intel processor with at least one first ISA instruction set architecture core, in order to achieve substantially the same result as a processor with at least one first ISA instruction set architecture core. The first ISA compiler 2304 represents a compiler that is operable to generate first ISA binary code 2306 (e.g., object code) that can, with or without additional linkage processing, be executed on the processor with at least one first ISA instruction set architecture core 2316. Similarly, FIG. 23 shows the program in the high-level language 2302 may be compiled using an alternative instruction set architecture compiler 2308 to generate alternative instruction set architecture binary code 2310 that may be natively executed by a processor without a first ISA instruction set architecture core 2314. The instruction converter 2312 is used to convert the first ISA binary code 2306 into code that may be natively executed by the processor without a first ISA instruction set architecture core 2314. This converted code is not necessarily to be the same as the alternative instruction set architecture binary code 2310; however, the converted code will accomplish the general operation and be made up of instructions from the alternative instruction set architecture. Thus, the instruction converter 2312 represents software, firmware, hardware, or a combination thereof that, through emulation, simulation or any other process, allows a processor or other electronic device that does not have a first ISA instruction set architecture processor or core to execute the first ISA binary code 2306.

In one or more first embodiments, a processor comprises a decoder to decode a single instruction which is to comprise a first field to provide a first operand which indicates a destination location, and a second field to provide a second operand which indicates a source location, execution circuitry coupled to the decoder, the execution circuitry to execute the decoded single instruction, comprising the execution circuitry to access the source location, based on the second operand, to load first data and metadata which corresponds to the first data, wherein the first data comprises a compressed version of a matrix, execute a decompression operation, based on the first data and the metadata, to obtain second data which comprises a decompressed version of the matrix, and provide the second data to the destination location based on the first operand.

In one or more second embodiments, further to the first embodiment, the single instruction is to further comprise a third operand which identifies a number of elements of the compressed version of a matrix, and wherein the execution circuitry is to execute the decompression operation further based on the third operand.

In one or more third embodiments, further to the first embodiment or the second embodiment, the metadata comprises a bitmap which comprises bits each corresponding to a different respective entry of the matrix, wherein, for each bit of the bitmap, a respective value of the bit indicates whether the corresponding entry of the matrix is to be equal to zero.

In one or more fourth embodiments, further to any of the first through third embodiments, elements of the matrix each correspond to a respective neural network weight.

In one or more fifth embodiments, further to any of the first through fourth embodiments, one of the first operand or the second operand comprises an identifier of a register.

In one or more sixth embodiments, further to any of the first through fifth embodiments, one of the first operand or the second operand comprises an identifier of an address corresponding to a location in a memory.

In one or more seventh embodiments, further to any of the first through sixth embodiments, the execution circuitry is further to determine, based on an opcode of the single instruction, that the matrix comprises byte-sized elements.

In one or more eighth embodiments, further to any of the first through seventh embodiments, the execution circuitry is further to determine, based on an opcode of the single instruction, that the matrix comprises word-sized elements.

In one or more ninth embodiments, further to any of the first through eighth embodiments, the execution circuitry is further to detect, based on an opcode of the single instruction, a hint regarding a storage of the second data to a cache.

In one or more tenth embodiments, a method at a processor comprises decoding a single instruction which comprises a first field comprising a first operand which indicates a destination location, and a second field comprising a second operand which indicates a source location, executing the decoded single instruction with execution circuitry of the processor, comprising accessing the source location, based on the second operand, to load first data and metadata which corresponds to the first data, wherein the first data comprises a compressed version of a matrix, executing a decompression operation, based on the first data and the metadata, to obtain second data which comprises a decompressed version of the matrix, and providing the second data to the destination location based on the first operand.

In one or more eleventh embodiments, further to the tenth embodiment, the single instruction further comprises a third operand which identifies a number of elements of the compressed version of a matrix, wherein the execution circuitry executes the decompression operation further based on the third operand.

In one or more twelfth embodiments, further to the tenth embodiment or the eleventh embodiment, the metadata comprises a bitmap which comprises bits each corresponding to a different respective entry of the matrix, wherein, for each bit of the bitmap, a respective value of the bit indicates whether the corresponding entry of the matrix is to be equal to zero.

In one or more thirteenth embodiments, further to any of the tenth through twelfth embodiments, elements of the matrix each correspond to a respective neural network weight.

In one or more fourteenth embodiments, further to any of the tenth through thirteenth embodiments, one of the first operand or the second operand comprises an identifier of a register.

In one or more fifteenth embodiments, further to any of the tenth through fourteenth embodiments, one of the first operand or the second operand comprises an identifier of an address corresponding to a location in a memory.

In one or more sixteenth embodiments, further to any of the tenth through fifteenth embodiments, an opcode of the single instruction indicates to the execution circuitry that the matrix comprises byte-sized elements.

In one or more seventeenth embodiments, further to any of the tenth through sixteenth embodiments, an opcode of the single instruction indicates to the execution circuitry that the matrix comprises word-sized elements.

In one or more eighteenth embodiments, further to any of the tenth through seventeenth embodiments, an opcode of the single instruction indicates to the execution circuitry a hint regarding a storage of the second data to a cache.

In one or more nineteenth embodiments, a method at a processor comprises translating a single instruction according to a first instruction set architecture (ISA) into one or more second instructions according to a second ISA, the single instruction comprising a first field comprising a first operand which indicates a destination location, and a second field comprising a second operand which indicates a source location, decoding the one or more second instructions to generate a decoded one or more third instructions, executing the decoded one or more third instructions with execution circuitry of the processor, comprising accessing the source location, based on the second operand, to load first data and metadata which corresponds to the first data, wherein the first data comprises a compressed version of a matrix, executing a decompression operation, based on the first data and the metadata, to obtain second data which comprises a decompressed version of the matrix, and providing the second data to the destination location based on the first operand.

In one or more twentieth embodiments, further to the nineteenth embodiment, the single instruction further comprises a third operand which identifies a number of elements of the compressed version of a matrix, wherein the execution circuitry executes the decompression operation further based on the third operand.

In one or more twenty-first embodiments, further to the nineteenth embodiment or the twentieth embodiment, the metadata comprises a bitmap which comprises bits each corresponding to a different respective entry of the matrix, wherein, for each bit of the bitmap, a respective value of the bit indicates whether the corresponding entry of the matrix is to be equal to zero.

In one or more twenty-second embodiments, further to any of the nineteenth through twenty-first embodiments, elements of the matrix each correspond to a respective neural network weight.

In one or more twenty-third embodiments, further to any of the nineteenth through twenty-second embodiments, one of the first operand or the second operand comprises an identifier of a register.

In one or more twenty-fourth embodiments, further to any of the nineteenth through twenty-third embodiments, one of the first operand or the second operand comprises an identifier of an address corresponding to a location in a memory.

In one or more twenty-fifth embodiments, further to any of the nineteenth through twenty-fourth embodiments, an opcode of the single instruction indicates to the execution circuitry that the matrix comprises byte-sized elements.

In one or more twenty-sixth embodiments, further to any of the nineteenth through twenty-fifth embodiments, an opcode of the single instruction indicates to the execution circuitry that the matrix comprises word-sized elements.

In one or more twenty-seventh embodiments, further to any of the nineteenth through twenty-sixth embodiments, an opcode of the single instruction indicates to the execution circuitry a hint regarding a storage of the second data to a cache.

In one or more twenty-eighth embodiments, a non-transitory machine-readable medium has stored thereon one or more instructions which, when executed by a processor, causes the processor to perform a method, the method comprising decoding a single instruction which comprises a first field comprising a first operand which indicates a destination location, and a second field comprising a second operand which indicates a source location, executing the decoded single instruction with execution circuitry of the processor, comprising accessing the source location, based on the second operand, to load first data and metadata which corresponds to the first data, wherein the first data comprises a compressed version of a matrix, executing a decompression operation, based on the first data and the metadata, to obtain second data which comprises a decompressed version of the matrix, and providing the second data to the destination location based on the first operand.

In one or more twenty-ninth embodiments, further to the twenty-eighth embodiment, the single instruction further comprises a third operand which identifies a number of elements of the compressed version of a matrix, and wherein the execution circuitry executes the decompression operation further based on the third operand.

In one or more thirtieth embodiments, further to the twenty-eighth embodiment or the twenty-ninth embodiment, the metadata comprises a bitmap which comprises bits each corresponding to a different respective entry of the matrix, wherein, for each bit of the bitmap, a respective value of the bit indicates whether the corresponding entry of the matrix is to be equal to zero.

In one or more thirty-first embodiments, further to any of the twenty-eighth through thirtieth embodiments, elements of the matrix each correspond to a respective neural network weight.

In one or more thirty-second embodiments, further to any of the twenty-eighth through thirty-first embodiments, one of the first operand or the second operand comprises an identifier of a register.

In one or more thirty-third embodiments, further to any of the twenty-eighth through thirty-second embodiments, one of the first operand or the second operand comprises an identifier of an address corresponding to a location in a memory.

In one or more thirty-fourth embodiments, further to any of the twenty-eighth through thirty-third embodiments, an opcode of the single instruction indicates to the execution circuitry that the matrix comprises byte-sized elements.

In one or more thirty-fifth embodiments, further to any of the twenty-eighth through thirty-fourth embodiments, an opcode of the single instruction indicates to the execution circuitry that the matrix comprises word-sized elements.

In one or more thirty-sixth embodiments, further to any of the twenty-eighth through thirty-fifth embodiments, an opcode of the single instruction indicates to the execution circuitry a hint regarding a storage of the second data to a cache.

In one or more thirty-seventh embodiments, a system comprises a memory, a processor coupled to the memory, the processor comprising a decoder to decode a single instruction which is to comprise a first field to provide a first operand which indicates a destination location, and a second field to provide a second operand which indicates a source location, execution circuitry coupled to the decoder, the execution circuitry to execute the decoded single instruction, comprising the execution circuitry to access the source location, based on the second operand, to load first data and metadata which corresponds to the first data, wherein the first data comprises a compressed version of a matrix, execute a decompression operation, based on the first data and the metadata, to obtain second data which comprises a decompressed version of the matrix, and provide the second data to the destination location based on the first operand. The system further comprises a display device coupled to the processor, the display device to display an image based on the second data.

In one or more thirty-eighth embodiments, further to the thirty-seventh embodiment, the single instruction is to further comprise a third operand which identifies a number of elements of the compressed version of a matrix, and wherein the execution circuitry is to execute the decompression operation further based on the third operand.

In one or more thirty-ninth embodiments, further to the thirty-seventh embodiment or the thirty-eighth embodiment, the metadata comprises a bitmap which comprises bits each corresponding to a different respective entry of the matrix, wherein, for each bit of the bitmap, a respective value of the bit indicates whether the corresponding entry of the matrix is to be equal to zero.

In one or more fortieth embodiments, further to any of the thirty-seventh through thirty-ninth embodiments, elements of the matrix each correspond to a respective neural network weight.

In one or more forty-first embodiments, further to any of the thirty-seventh through fortieth embodiments, one of the first operand or the second operand comprises an identifier of a register.

In one or more forty-second embodiments, further to any of the thirty-seventh through forty-first embodiments, one of the first operand or the second operand comprises an identifier of an address corresponding to a location in a memory.

In one or more forty-third embodiments, further to any of the thirty-seventh through forty-second embodiments, the execution circuitry is further to determine, based on an opcode of the single instruction, that the matrix comprises byte-sized elements.

In one or more forty-fourth embodiments, further to any of the thirty-seventh through forty-third embodiments, the execution circuitry is further to determine, based on an opcode of the single instruction, that the matrix comprises word-sized elements.

In one or more forty-fifth embodiments, further to any of the thirty-seventh through forty-fourth embodiments, the execution circuitry is further to detect, based on an opcode of the single instruction, a hint regarding a storage of the second data to a cache.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" or "A, B, and/or C" is intended to be understood to mean either A, B, or C, or any combination thereof (i.e. A and B, A and C, B and C, and A, B and C).

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A processor comprising:
a decoder to decode a single instruction which is to comprise:
  a first field to provide a first operand which indicates a destination location; and
  a second field to provide a second operand which indicates a source location;
execution circuitry coupled to the decoder, the execution circuitry to execute the decoded single instruction, comprising the execution circuitry to:
  access the source location, based on the second operand, to load first data and metadata which corresponds to the first data, wherein the first data comprises a compressed version of a matrix;
  execute a decompression operation, based on the first data and the metadata, to obtain second data which comprises a decompressed version of the matrix; and
  provide the second data to the destination location based on the first operand; wherein:
the metadata is to comprise a bitmap which comprises bits each corresponding to a different respective location of the decompressed version of the matrix, wherein, for each of the bits, a respective value of the bit is to indicate whether a respective value at the corresponding location of the decompressed version of the matrix is to be equal to zero;
the single instruction is further to comprise a third field to provide a third operand which is to identify a total number of elements of the decompressed version of the matrix;
the execution circuitry is to execute the decompression operation further based on the third operand; and the execution circuitry to execute the decompression operation comprises:
  for each element of one or more elements of the compressed version of the matrix, the execution circuitry to:
    determine a respective first location of the bitmap as corresponding to the element, wherein the execution circuitry is to determine the respective first location based on each of:
  a first ordered sequence of multiple locations of the compressed version of the matrix;
  a second ordered sequence of multiple locations of the bitmap; and
  a value of a respective bit at the respective first location;
determine a respective second location of the decompressed version of the matrix as corresponding to the element, wherein the execution circuitry is to determine the respective second location based on each of:
  the respective first location of the bitmap; and
  a correspondence of the multiple locations of the bitmap each with a different respective location of multiple locations of the decompressed version of the matrix; and
provide a value of the element at the respective second location.

2. The processor of claim 1, wherein elements of the matrix each correspond to a respective neural network weight.

3. The processor of claim 1, wherein one of the first operand or the second operand comprises an identifier of a register.

4. The processor of claim 1, wherein one of the first operand or the second operand comprises an identifier of an address corresponding to a location in a memory.

5. The processor of claim 1, wherein the execution circuitry is further to determine, based on an opcode of the single instruction, that the matrix comprises byte-sized elements.

6. The processor of claim 1, wherein the execution circuitry is further to determine, based on an opcode of the single instruction, that the matrix comprises word-sized elements.

7. The processor of claim 1, wherein the execution circuitry is further to detect, based on an opcode of the single instruction, a hint regarding a storage of the second data to a cache.

8. A method at a processor, the method comprising:
translating a single instruction according to a first instruction set architecture (ISA) into one or more second instructions according to a second ISA, the single instruction comprising:
  a first field comprising a first operand which indicates a destination location; and
  a second field comprising a second operand which indicates a source location;
decoding the one or more second instructions to generate a decoded one or more third instructions;
executing the decoded one or more third instructions with execution circuitry of the processor, comprising:
  accessing the source location, based on the second operand, to load first data and metadata which corresponds to the first data, wherein the first data comprises a compressed version of a matrix;
  executing a decompression operation, based on the first data and the metadata, to obtain second data which comprises a decompressed version of the matrix; and
  providing the second data to the destination location based on the first operand; wherein:
the metadata comprises a bitmap which comprises bits each corresponding to a different respective location of the decompressed version of the matrix, wherein, for each of the bits, a respective value of the bit indicates whether a respective value at the corresponding loca-
tion of the decompressed version of the matrix is to be
equal to zero;
the single instruction further comprises a third field which
provides a third operand which identifies a total number
of elements of the decompressed version of the matrix;
executing the decompression operation is further based on
the third operand; and
executing the decompression operation comprises:
  for each element of one or more elements of the
    compressed version of the matrix:
    determining a respective first location of the bitmap
      as corresponding to the element, comprising deter-
      mining the respective first location based on each
      of:
      a first ordered sequence of multiple locations of
        the compressed version of the matrix;
      a second ordered sequence of multiple locations of
        the bitmap; and
      a value of a respective bit at the respective first
        location;
    determining a respective second location of the
      decompressed version of the matrix as corre-
      sponding to the element, comprising determining
      the respective second location based on each of:
      the respective first location of the bitmap; and
      a correspondence of the multiple locations of the
        bitmap each with a different respective location
        of multiple locations of the decompressed ver-
        sion of the matrix; and
    providing a value of the element at the respective
      second location.
9. The method of claim 8, wherein one of the first operand
or the second operand comprises an identifier of a register.
10. The method of claim 8, wherein an opcode of the
single instruction indicates to the execution circuitry that the
matrix comprises byte-sized elements.
11. The method of claim 8, wherein an opcode of the
single instruction indicates to the execution circuitry a hint
regarding a storage of the second data to a cache.
12. A non-transitory machine-readable medium storing
one or more instructions which, when executed by a pro-
cessor, causes the processor to perform a method, the
method comprising:
  decoding a single instruction which comprises:
    a first field comprising a first operand which indicates
      a destination location; and
    a second field comprising a second operand which
      indicates a source location;
  executing the decoded single instruction with execution
    circuitry of the processor, comprising:

accessing the source location, based on the second
  operand, to load first data and metadata which cor-
  responds to the first data, wherein the first data
  comprises a compressed version of a matrix;
executing a decompression operation, based on the first
  data and the metadata, to obtain second data which
  comprises a decompressed version of the matrix; and
providing the second data to the destination location
  based on the first operand; wherein:
the metadata comprises a bitmap which comprises bits
  each corresponding to a different respective location of
  the decompressed version of the matrix, wherein, for
  each of the bits, a respective value of the bit indicates
  whether a respective value at the corresponding loca-
  tion of the decompressed version of the matrix is to be
  equal to zero;
the single instruction further comprises a third field which
  provides a third operand which identifies a total number
  of elements of the decompressed version of the matrix;
executing the decompression operation is further based on
  the third operand; and
executing the decompression operation comprises:
  for each element of one or more elements of the
    compressed version of the matrix:
    determining a respective first location of the bitmap
      as corresponding to the element, comprising deter-
      mining the respective first location based on each
      of:
      a first ordered sequence of multiple locations of
        the compressed version of the matrix;
      a second ordered sequence of multiple locations of
        the bitmap; and
      a value of a respective bit at the respective first
        location;
    determining a respective second location of the
      decompressed version of the matrix as corre-
      sponding to the element, comprising determining
      the respective second location based on each of:
      the respective first location of the bitmap; and
      a correspondence of the multiple locations of the
        bitmap each with a different respective location
        of multiple locations of the decompressed ver-
        sion of the matrix; and
    providing a value of the element at the respective
      second location.
13. The machine-readable medium of claim 12, wherein
elements of the matrix each correspond to a respective
neural network weight.
14. The machine-readable medium of claim 12, wherein
an opcode of the single instruction indicates to the execution
circuitry that the matrix comprises byte-sized elements.

* * * * *